United States Patent [19]

Lawlor

[11] Patent Number: 5,474,425
[45] Date of Patent: Dec. 12, 1995

[54] WIND TURBINE ROTOR BLADE

[75] Inventor: Shawn P. Lawlor, Bellevue, Wash.

[73] Assignee: Advanced Wind Turbines, Inc., Seattle, Wash.

[21] Appl. No.: 120,658

[22] Filed: Sep. 13, 1993

Related U.S. Application Data

[63] Continuation-in-part of Ser. No. 854,322, Mar. 18, 1992, abandoned.

[51] Int. Cl.[6] ........................................... F03D 1/06
[52] U.S. Cl. ........................................ 416/223 R; 416/233
[58] Field of Search ................................ 416/223 R, 226, 416/233, DIG. 2

[56] References Cited

U.S. PATENT DOCUMENTS

| | | | |
|---|---|---|---|
| 1,802,094 | 4/1931 | Stuart | 416/223 R |
| 2,236,494 | 3/1941 | Albers | 416/223 R |
| 4,150,301 | 4/1979 | Bergey | 416/DIG. 2 |
| 4,316,698 | 2/1982 | Bertoia | 416/11 |
| 4,366,387 | 12/1982 | Carter et al. | 416/226 |
| 4,408,958 | 10/1983 | Schacle | 416/226 |
| 4,474,536 | 10/1984 | Gougeon et al. | 416/226 |
| 4,557,666 | 12/1985 | Baskin et al. | 416/226 |
| 4,976,587 | 12/1990 | Johnston et al. | 416/226 |

FOREIGN PATENT DOCUMENTS

| 456963 | 5/1949 | Canada | 416/DIG. 2 |
|---|---|---|---|

Primary Examiner—F. Daniel Lopez
Assistant Examiner—James A. Larson

[57] ABSTRACT

Horizontal axis, free yaw, self-regulated wind turbines which have strong, lightweight, fatigue resistant, fixed pitch, wood/GRE blades and exhibit superior performance a range of wind speeds. The blades are designed by employing defined inboard, midspan, and outboard airfoil profiles and interpolating the profiles between the defined profiles and from the latter to the root and the tip of the blades.

36 Claims, 16 Drawing Sheets

A = PRIMARY DEFINITIONAL STATION
B = SPANWISE CUBIC SPLINE
C = INTERMEDIATE AIRFOIL PROFILE
    INTERPOLATED FROM SPANWISE SPLINES

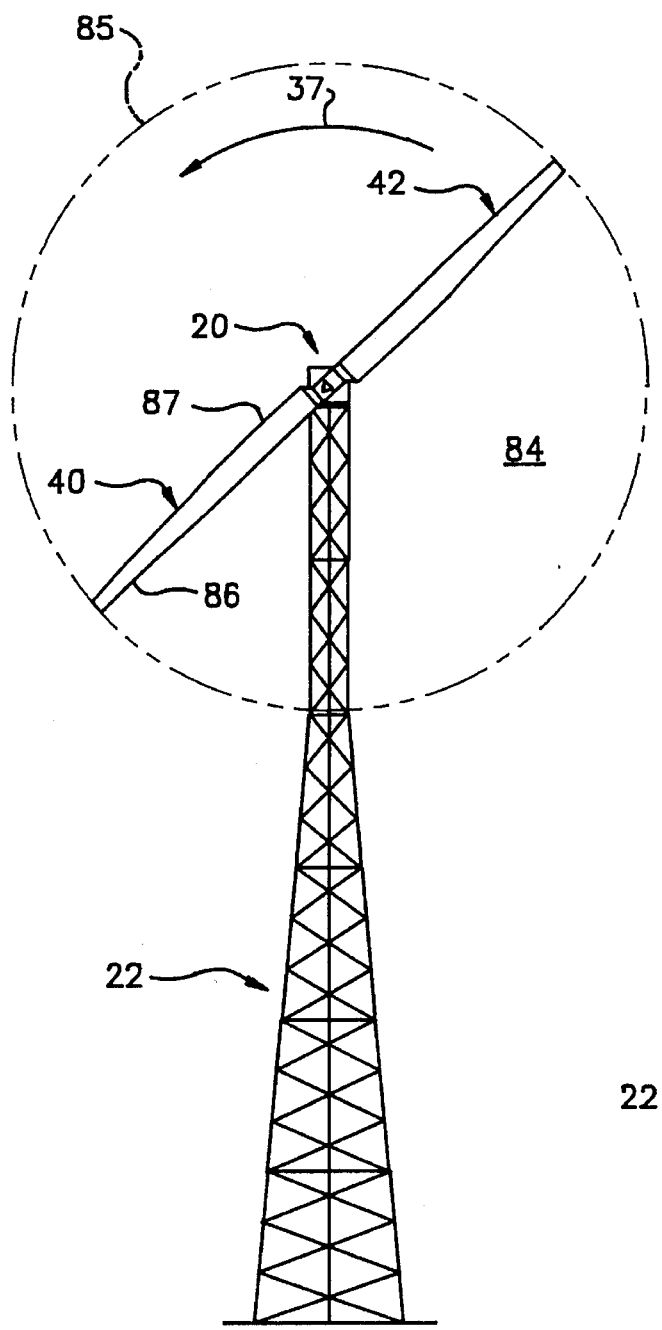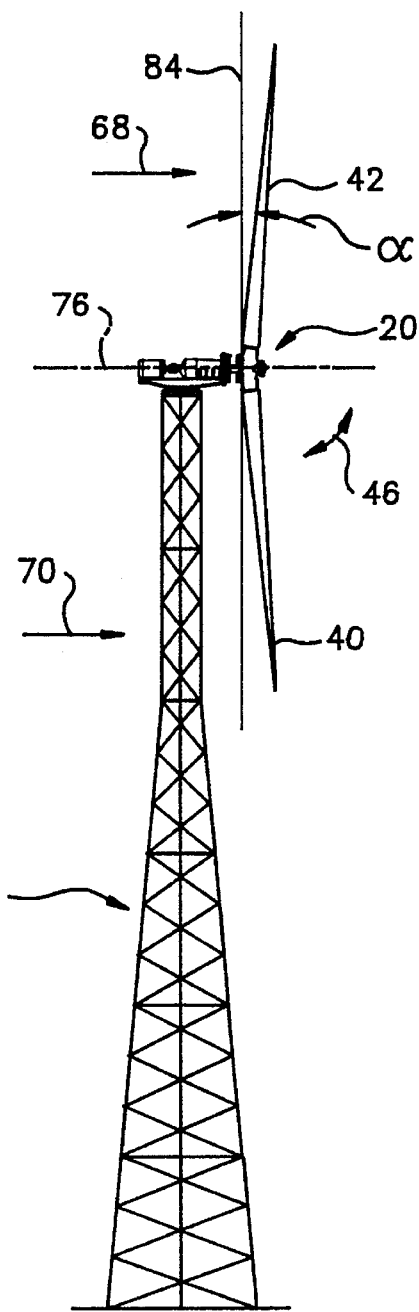

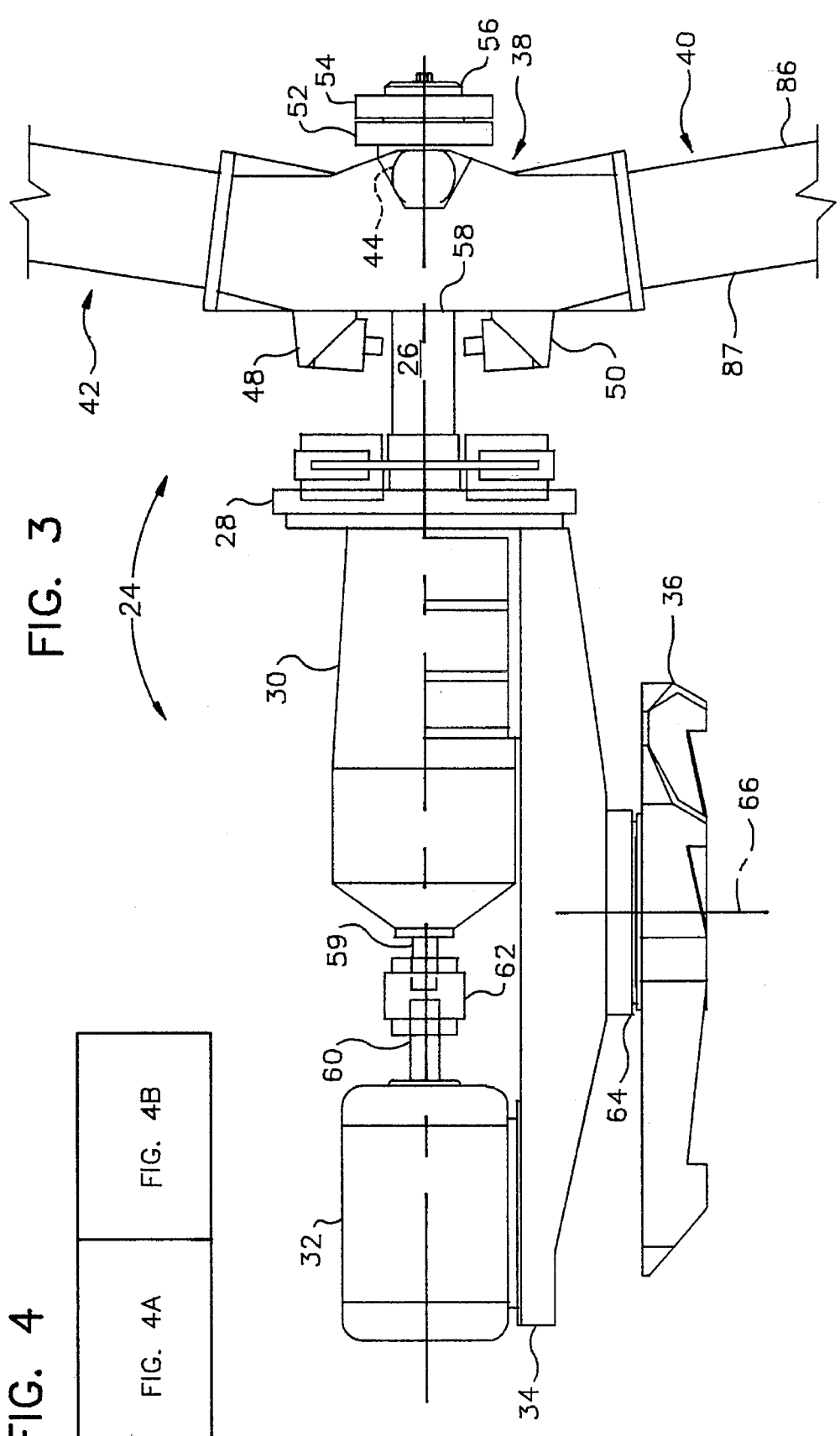

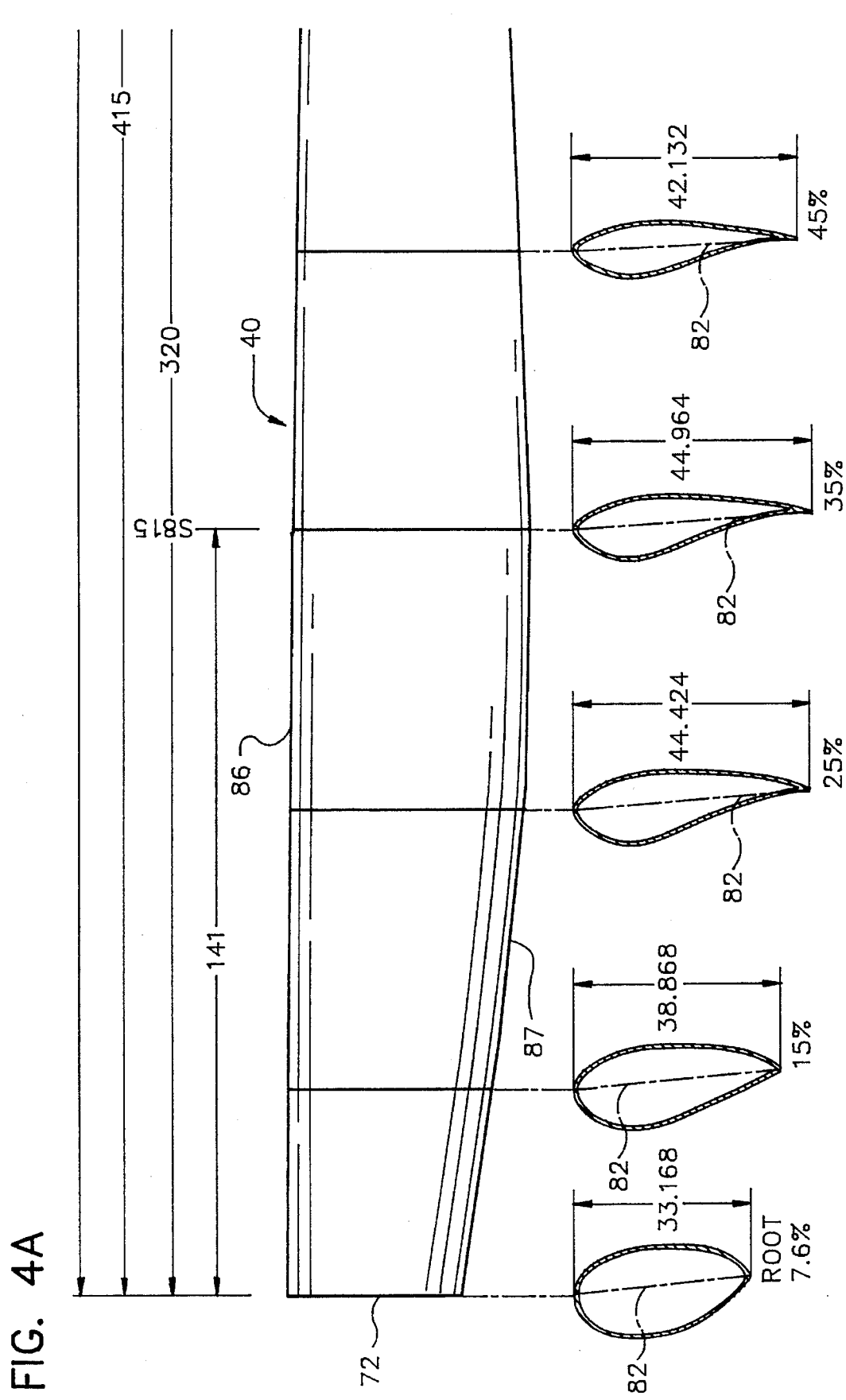

A = PRIMARY DEFINITIONAL STATION
B = SPANWISE CUBIC SPLINE
C = INTERMEDIATE AIRFOIL PROFILE INTERPOLATED FROM SPANWISE SPLINES n DEG = BLADE PITCH ANGLE

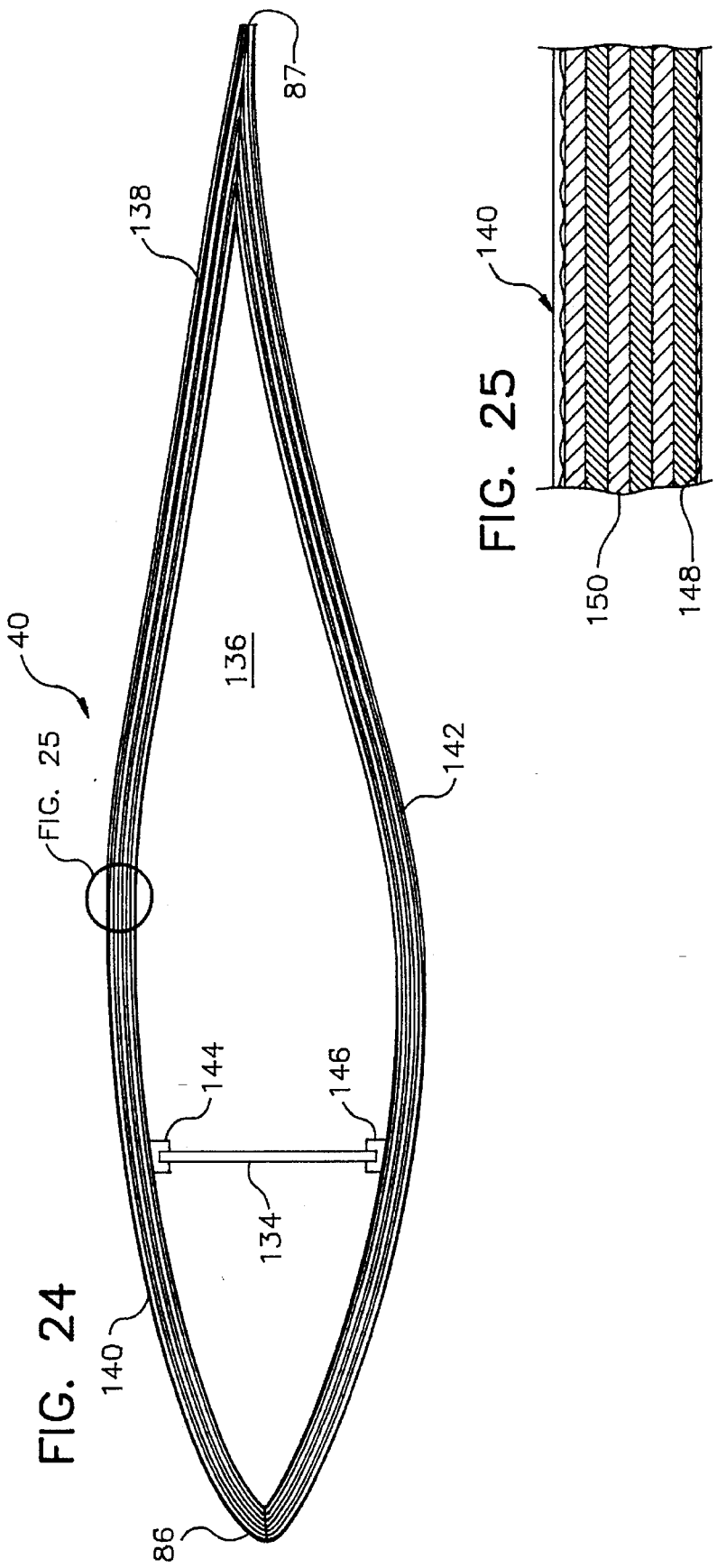

WIND TURBINE ROTOR BLADE

This application is a continuation-in-part of application No. 07/854,322 filed 18 Mar. 1992 abandoned.

TECHNICAL FIELD OF THE INVENTION

The present invention relates to wind turbines and to novel, improved wind turbine rotors and rotor blades.

CROSS REFERENCE TO A RELATED APPLICATION

DEFINITIONS

As employed herein:

bp=blade pitch c is the local chord of a blade; i.e. the chord at a particular spanwise station Chordwise Station is a location at a designated distance from the leading edge of a blade $C_{lmax}$=maximum lift coefficient $C_p$=power coefficient GRE=glass reinforced epoxy h is the height of the mean chord line of a blade at a given chordwise station relative to a zero level R is the distance from the axis of rotation of a rotor to the tip of the rotor blades r is the distance from the axis of rotation of a rotor to a particular spanwise station Spanwise station is a location along the span of a blade t is the thickness of the blade at a particular chordwise station Tip Speed Ratio is tip speed divided by wind speed

BACKGROUND OF THE INVENTION

In recent years, it has become apparent that conventional methods of generating electricity will soon be insufficient to meet the world's ever-growing energy requirements for electric power. Several factors, including the pollution which results from the combustion of fossil fuels, the dangers associated with the operation of nuclear reactors, and the limitations inherent in the traditional hydroelectric and more modern approaches to the generation of electricity such as solar energy conversion and fuel cells have encouraged the development of alternative sources of electric power.

One of these is the use of high efficiency wind turbines as prime movers for electrical generators.

Numerous systems for generating electricity from the wind have been proposed. Among the most successful of these systems have been the horizontal axis wind turbines (HAWT's) which derive their name from the fact that the turbine rotor has a generally horizontal axis of rotation and either two or three blades. The rotor is designed to rotate under the influence of the wind. This rotation is subsequently used to generate electric power by means of a drive train, gearbox, and generator.

In a typical installation, the resulting power is supplied to the local utility by means of transformers and substation-controlled connections. Generally, wind energy projects have large numbers of wind turbine generating systems at locations with favorable wind conditions. Several of these so-called "wind farms" are located in the state of California.

In this general class of HAWT wind turbines are two notable sub-classes—stall-regulated rotors and those with active or partially active adjustable pitch rotors. Stall-regulated rotors have blades which do not change pitch and depend on careful aerodynamic blade design for peak power control. Wind turbines with active and partially active pitch systems include a mechanism, usually hydraulic, to physically change the orientation or "pitch" of the blade, either at its root or an outboard station, in such a way so as to limit the power generated by the rotor to a selected maximum value. This limitation is generally dictated by maximum power or load capabilities of other system components.

Wind turbine rotors with adjustable pitch blades are complicated and expensive because of the mechanism required to adjust the blade pitch and to control this adjustment as wind conditions change. Furthermore, maintenance of these rotors is a burden, especially in those not uncommon applications in which wind turbines are employed in considerable numbers at remote locations and in third world countries and other locales where skilled mechanics are more than likely not available.

Because of the foregoing and other drawbacks of adjustable pitch wind turbine rotors, considerable attention has been devoted to those of the self-regulating, stall-regulated type. The efficiency with which typical stall-regulated wind turbine rotors convert wind energy into useable mechanical shaft power is dominated by the aerodynamic characteristics of the airfoil sections employed in the rotor blades as well as the basic planform and geometry of the blades. Due to the large spanwise variations in the velocity and direction of the air relative to the blade, stall-regulated wind turbine blades have some unique requirements associated with efficient operation. These needs are not met by the airfoil sections developed over the past half century for use in fixed and rotary wing aircraft.

One major problem appurtenant to contemporary stall-regulated blades is that effective stall regulation cannot be achieved at peak (high wind speed) power levels without compromising low wind speed performance if a single family of airfoil profiles is employed as has perhaps most often heretofore been the case.

Another major problem with contemporary blades is the loss of rotor efficiency caused by soiling and the accumulation of debris on the leading edges of the blades. This increased surface roughness causes significant reductions in rotor efficiency.

In sum, currently available stall-regulated wind turbines have a number of deficiencies, and there is a continuing need for improved machines of this character.

SUMMARY OF THE INVENTION

This need is satisfied by the novel, improved horizontal axis wind turbines of the present invention.

These novel wind machines are stall regulated, and they are rotated up to speed. As a consequence, fixed pitched blades can be employed and the disadvantages of rotors with adjustable pitch—high capital and maintenance costs, lack of durability, etc.—can be eliminated.

The rotor blades employ National Renewable Energy Laboratory (NREL) airfoil profiles or relatives of those profiles toward the root and tip and near the midspan of the blade. Intermediate profiles are developed by lofting.

The particular NREL airfoil profiles employed in the present invention are selected from a family of profiles with thick sections. These profiles have characteristics which make them usable in rotors with radii in the 25–50 foot range, and they have the advantage of being relatively insensitive to blade surface roughness. Profiles with low, medium, and high coefficients of lift are employed at the defined blade tip, midspan, and root stations.

Thus, in contrast to the approach heretofore typically employed in the design of blades for stall-regulated wind machines relying on other currently available blade designs, the root, midspan, and tip segments of the blade have significantly different aerodynamic characteristics, all obtained without any significant reduction in lift-to-drag ratio (L/D).

The result is a wind turbine which generates power more efficiently, which has improved soiled blade performance characteristics, and which is less highly loaded. This reduces stresses on the wind turbine components, reducing maintenance requirements and increasing service life.

Another important advantage of the novel wind turbines disclosed herein is that they are self-regulating. Peak power outputs are quickly reached, and the rotor blades stall in a fashion which keeps maximum design torques and thrust loads from being exceeded.

The power coefficient of a blade employing the principles of the present invention is a maximum at relatively low wind speeds (ca. 15–30 mph). Therefore, wind turbines employing the principles of the present invention exhibit superior performance in locales in which the prevailing winds blow at these lower speeds.

The hollow wood and GRE blade construction with variable blade wall thickness preferably employed in constructing the wind turbine blades of the present invention, low inboard taper ratio (maximum chord/root chord), local chord together with twist schedule, and elimination of tip brakes and the associated internal blade structure result in a blade which has a very low weight but high strength and the highest possible energy production per unit of blade weight.

The objects and other features and advantages of the invention will be apparent to the reader from the foregoing and the appended claims and as the ensuing detailed description and discussion proceeds in conjunction with the accompanying drawings.

BRIEF DESCRIPTION OF THE DRAWING

FIG. 1 is a front view of a wind turbine embodying the principles of the present invention and of the tower on which the wind turbine is mounted;

FIG. 2 is a side view of the wind turbine and its supporting tower;

FIG. 3 is a somewhat simplified side view of the wind turbine, drawn to an enlarged scale to more clearly show its components;

FIGS. 5, 6 and 7 positively define the airfoil shown in FIG. 5;

FIG. 24 is a representative cross-section through a blade of the FIG. 1 wind turbine; and FIG. 25 is the fragment FIG. 24 embraced by the phantom line circle drawn to an enlarged scale to show the details of the blade construction.

DETAILED DESCRIPTION OF THE INVENTION

Figure 4B:
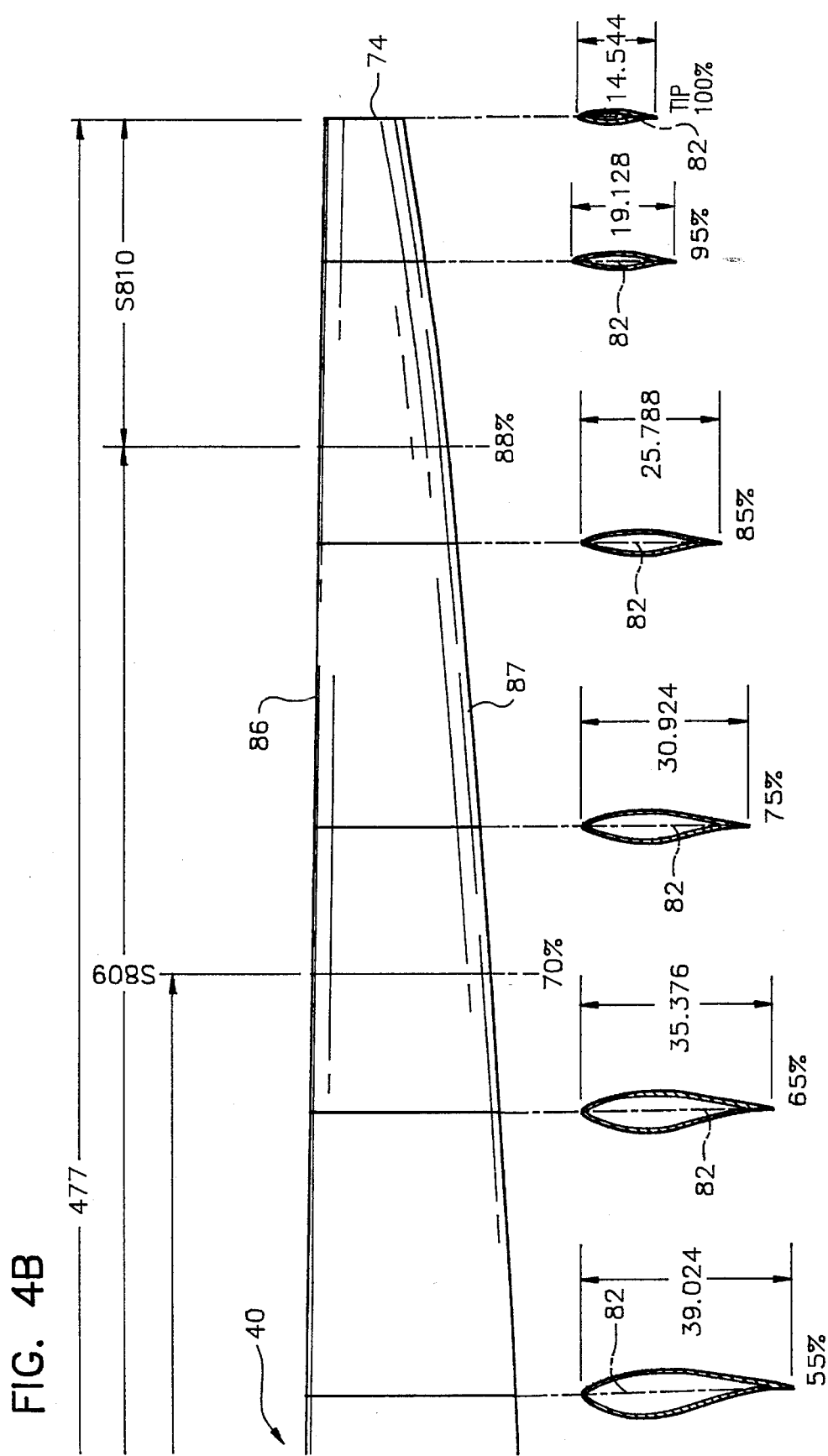
FIG. 4 shows the relationship between FIGS. 4A and 4B which, taken together, show the plan of one of the wind turbine's two essentially identical blades and the profile of the blade at representative stations along its span.
FIG. 4C shows, pictorially, the lofting process employed in designing a wind turbine blade in accord with the principles of the present invention.

Referring now to the drawing, FIG. 1 depicts a horizontal axis, free yaw stall-regulated wind turbine 20 constructed in accord with, and embodying the principles of the present invention. Turbine 20 is mounted on the top of a tower 22 which will typically be 80 feet tall. The tower is not part of the present invention and will accordingly not be described in any detail herein.

As is shown in FIGS. 1 and 2 and in more detail in FIG. 3, wind turbine 20 includes a fixed pitch rotor 24 which turns in the direction indicated by arrow 37 in FIG. 1. The rotor is fixed to the outboard end of a rotor shaft 26, a disc brake 28, a gearbox 30, and a motor/generator 32. These components are mounted on a main frame 34 which is rotatably supported on and coupled to a tower top 36. The latter is bolted or otherwise secured to the upper end of tower 22.

Referring now primarily to FIG. 3, wind turbine rotor 24 has a hub 38 and two, essentially identical, diametrically opposed blades 40 and 42. Blades 40 and 42 can be fastened to hub by bolts extending from the interior side of the hub flange into internally threaded inserts at the root ends of the blades. The fastening system has not been shown and will not be described in detail herein as that system is not part of the present invention except for the selection of a system which allows the pitch angle of the blades to be adjusted to meet the exigencies of a particular application of the invention.

Rotor shaft 26 extends through hub 38 which is mounted on a transversely extending teeter trunion 44. This allows the hub to rock relative to shaft 26 about an axis normal to the axis of shaft rotation as shown by arrow 46 in FIG. 2. Teetering hubs are not uncommon rotor mounting arrangements. They are employed to reduce the bending loads on wind turbine blades.

Abrupt movements of the turbine blades 40 and 42 which might damage turbine 20 are prevented by teeter dampers 48 and 50 mounted on the back side of rotor hub 38.

Rotor 24 is held on its shaft 26 by a friction retaining device 52/54 and a threaded retainer 56. That component clamps rotor teeter trunion 44 against a shoulder 58 on shaft 26.

As shown in FIG. 3, rotor shaft 26 is coupled to gearbox 30 through the above-mentioned disc brake 28. That brake serves as a governor; it keeps the turbine from running away and being damaged when wind speeds are high.

Gearbox 30 is conventional. It includes gears (not shown) so selected that its output shaft 59 will drive motor/generator 32 at design speed. In a typical application of the present invention, motor/generator 32 may output over 275 kw of usable electrical power.

The motor/generator 32 is also employed to motor rotor 24 up to speed when wind turbine 20 is started up. This will typically be about 60 rpm.

The provision for motoring rotor 24 up to speed is significant. It eliminates the complicated adjustable pitch mechanisms and root chord build-ups which self-starting wind turbines require. As was pointed out above, these are complicated, expensive mechanisms which are relatively delicate and prone to failure and must be serviced by skilled and trained mechanics.

The output shaft 59 of gearbox 30 drives the input shaft 60 of motor/generator 32 through a conventional coupling 62. The thus coupled together gearbox 30 and motor/generator 32 are bolted or otherwise fixed to wind turbine main frame 34 as shown in FIG. 3.

The main frame is, in turn, supported from tower top 36 by a yaw bearing 64. This bearing which allows the main frame to freely rotate relative to the tower top about vertical axis 66 so that the turbine will automatically face into wind moving toward the turbine as indicated by arrows 68 and 70.

As was pointed out above, the two blades 40 and 42 of wind turbine rotor 24 are virtually identical. Consequently, only blade 40 has been shown in detail in the drawings, and only it will for the most part be described below. It is to be understood that this is being done only for the sake of convenience and brevity, that this approach is not intended to limit the scope of the appended claims, and that the discussion of blade 40 is equally applicable to blade 42.

Turning then to FIG. 4, the exemplary blade 40 illustrated in that figure is of the full span type, meaning that it has a airfoil profile at every spanwise station from its root 72 to its tip 74. The exemplary, illustrated blade is 477 ins long, and the distance from the axis of rotation 76 of rotor 24 to the blade tip 74 is 516 ins. Blades of this character will typically range in length from 300 to 600 ins.

Three important design parameters of blade are twist, coning angle, and pitch angle.

Blade 40 has a total blade twist of not more than 10 degrees with a twist of 5.85 plus 3 degrees, minus 1 degrees being preferred. Total blade twist is the angle between the mean chord line at the root 72 of the blade and the mean chord line at its tip 74. This parameter dictates the shape of the wind turbine power curve and, also, the speed at which the blades 40 and 42 of turbine 24 will stall.

Figure 15:
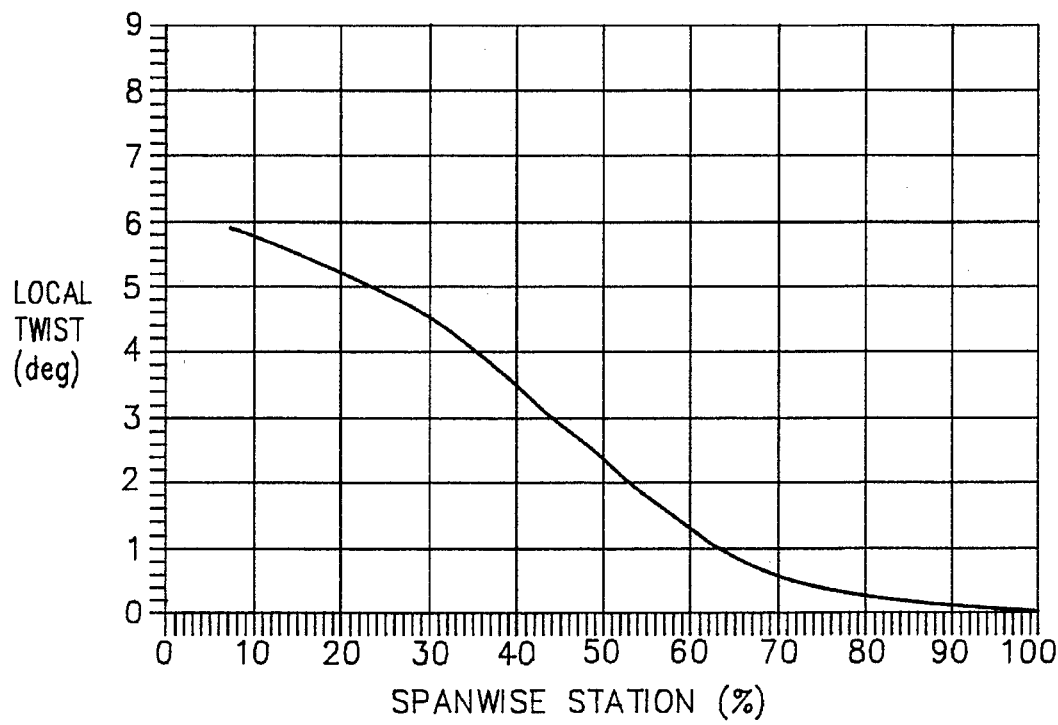

Table 1 contains a local twist distribution schedule for blades 40. The twist distribution schedule is presented graphically in FIG. 15.

TABLE 1

| r/R | Station (in) | Twist (deg) |
|---|---|---|
| 0.076 | 39.00 | 5.848 |
| 0.100 | 51.60 | 5.686 |
| 0.150 | 77.40 | 5.393 |
| 0.200 | 103.20 | 5.119 |
| 0.250 | 129.00 | 4.825 |
| 0.300 | 154.80 | 4.473 |
| 0.350 | 180.60 | 4.008 |
| 0.400 | 206.40 | 3.451 |
| 0.450 | 232.20 | 2.879 |
| 0.500 | 258.00 | 2.309 |
| 0.550 | 283.80 | 1.762 |
| 0.600 | 309.60 | 1.257 |
| 0.650 | 335.40 | 0.819 |
| 0.700 | 361.20 | 0.477 |
| 0.750 | 387.00 | 0.254 |
| 0.800 | 412.80 | 0.130 |
| 0.850 | 438.60 | 0.078 |
| 0.900 | 464.40 | 0.049 |
| 0.950 | 490.20 | 0.027 |
| 1.000 | 516.00 | 0.000 |

It may be possible to relax the blade twist or chord schedules slightly and reduce the peak power enough to support operation at a more optimal blade pitch angle. However, the loss in production associated with decreasing the twist and chord sufficiently to allow more optimal blade pitch will likely result in peak production levels slightly less than the production levels associated with a sub-optimally pitched, but more highly twisted and solid, blade.

The coning angle of a blade as described herein is in the range of 5 to 9 degrees. Blade 40 has a coning angle of 7 degrees.

The blade coning angle is the angle α between the blade and the blade's plane of rotation, which is identified by reference character 84 in FIGS. 1 and 2. The term coning angle is employed because, unless that angle is zero and the path swept by the blade will be a cone rather than a plane. Blade coning within the limits identified above is important because it reduces the structural loads on blades 40 and 42. Also, such blade coning ensures that the rotor will face squarely into the wind, which is important from the viewpoints of optimal power output and elimination of unbalanced loads.

Figure 18:
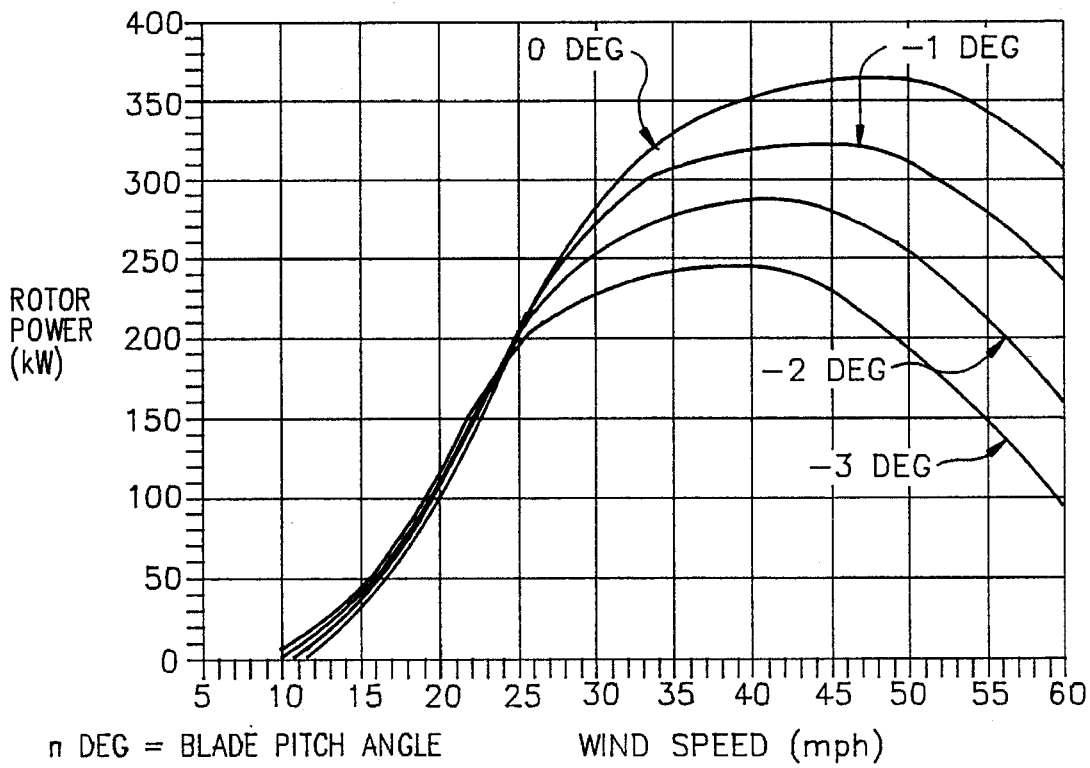
FIG. 18 shows the power which can be outputted by the FIG. 1 turbine with the blades at different degrees of pitch over a wide range of wind speeds.

The pitch angle as the term is employed herein is the angle of attack of blades 40 and 42; i.e., the angle between the mean chord line 82 of the blade at a particular chordwise station and plane 84. Selection of a pitch angle within the limits discussed above optimizes the peak power of turbine 24 and the slope of the power curve. Another operating performance parameter that is markedly effected by changes in pitch angle is the shaft horsepower developed by wind turbine 20 at particular wind speeds and over a designed range of wind speeds. This effect of pitch angle on rotor power is depicted graphically in FIG. 18.

The pitch angle of blade 40 may range from minus 5 to 5 degrees with a pitch angle in the range of −3 degrees to 0 degrees perhaps most often giving optimum results. Within the limits just discussed, changes in pitch angle can also be employed to optimize the efficiency of wind turbines of the type identified by reference character 20 for operation at different elevations. For example, a minus one degree blade pitch angle results in near optimal power production at sea level, good low wind speed performance, and the highest possible peak power obtainable from a wind turbine of the character described above. An operational setting of ∓degrees results in the most efficient operation at an altitude of 6000 feet.

Another important parameter of blade 40 is its thickness ratio t/c, which is a maximum of 0.26 or 26 percent.

Solidity is the ratio of the planform area occupied by blades 40 and 42 of rotor 24 and the area of the circle 85 swept by those blades as rotor 24 turns (see FIG. 1). Rotor 24 has a relatively low solidity, which is desirable. Specifically, as solidity increases, so do drag and blade loading. Therefore, as solidity increases, blade loads go up and structural requirements become more demanding. This is a decided disadvantage as the structure needed to accommodate increased loads adds to the capitol cost of the wind turbine and increases its weight.

Referring again to FIG. 4, the leading edge 86 of blade 40 is rectilinear.

The trailing edge 87 is defined by a smooth convex curve which increases in magnitude over that inboard segment of the blade extending from root 72 to about 30 percent R (154.80in.) and then smoothly decreases in magnitude from that station to blade tip 74. The illustrated non-linear trailing edge profile improves stall characteristics and improves low and mid wind speed power curve characteristics. The maximum chord of the illustrated, exemplary blade is at station 30 percent R (154.80 in.). This chord is 45.00 in±2.25 in. The chord at root 72 is 33.17 in±1.65 in, and the tip chord is 14.55 in±0.75 in with the nominal dimensions just identified being typical.

The chord distribution schedule of blade 40 appears in Table 2 below. It appears in graphical form in FIG. 14.

TABLE 2

| r/R | Station (in) | Chord (in) | c/R |
| --- | --- | --- | --- |
| 0.076 | 39.00 | 33.170 | 0.0643 |
| 0.100 | 51.60 | 35.098 | 0.0680 |
| 0.150 | 77.40 | 38.863 | 0.0753 |
| 0.200 | 103.20 | 42.090 | 0.0816 |
| 0.250 | 129.00 | 44.420 | 0.0861 |
| 0.300 | 154.80 | 45.496 | 0.0882 |
| 0.350 | 180.60 | 44.967 | 0.0871 |
| 0.400 | 206.40 | 43.562 | 0.0844 |
| 0.450 | 232.20 | 42.126 | 0.0816 |
| 0.500 | 258.00 | 40.625 | 0.0787 |
| 0.550 | 283.80 | 39.024 | 0.0756 |
| 0.600 | 309.60 | 37.287 | 0.0723 |
| 0.650 | 335.40 | 35.378 | 0.0686 |
| 0.700 | 361.20 | 33.260 | 0.0645 |
| 0.750 | 387.00 | 30.919 | 0.0599 |

TABLE 2-continued

| r/R | Station (in) | Chord (in) | c/R |
| --- | --- | --- | --- |
| 0.800 | 412.80 | 28.406 | 0.0551 |
| 0.850 | 438.60 | 25.786 | 0.0500 |
| 0.900 | 464.40 | 22.998 | 0.0446 |
| 0.950 | 490.20 | 19.129 | 0.0371 |
| 1.000 | 516.00 | 14.550 | 0.0282 |

Also presented in Table 2 above are the ratios c/R and r/R. These are non-dimensional locators of the spanwise stations and chords given in inches elsewhere in the table.

Wind turbine blade 40 is designed by employing definition airfoil profiles at specified stations or locations along the blade. The geometry of the blade between these definition stations is generated through numerical interpolation, a process typically referred to as lofting.

Figure 4C:
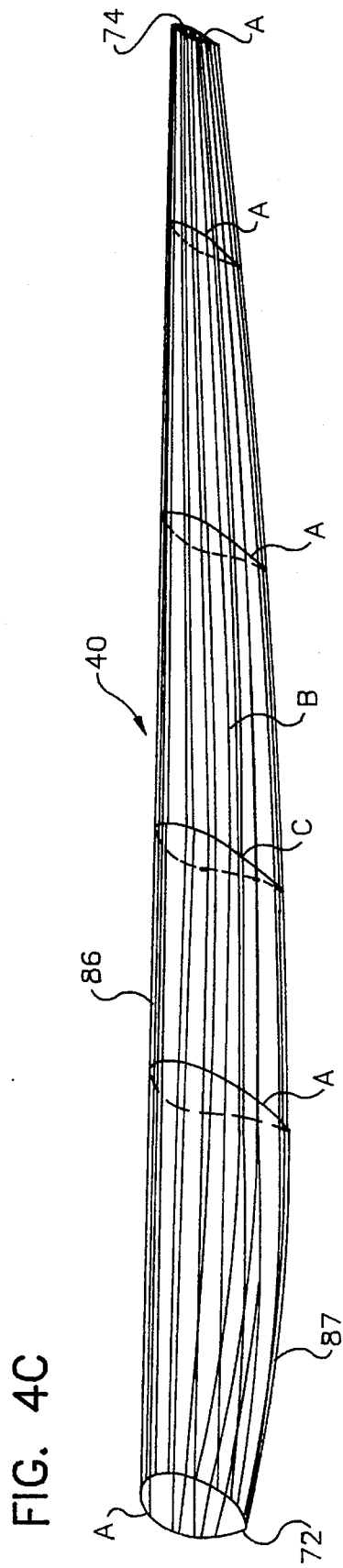

Blade 40 employs an NREL S815 airfoil profile at an inboard station 141 (35% R) toward the root 72 of the blade, an NREL S809 airfoil profile at midspan station 320 (70% R), and an NREL S810 airfoil profile from station 415 (88% R) to outboard station 477 (100% R) as shown by the double-headed arrow in FIG. 4B.

From root 72 (7.6% R) to station 141 (35% R), from station 141 (35% R) to station 320 (70% R), and from station 320 (70% R) to station 415 (88% R), blade 40 is lofted by connecting equally spaced points along the S815, S809, and S810 airfoil profiles with three dimensional cubic splines (see FIG. 4C) and then extending those splines to the root 72 of the blade. Figuratively, a cubic spline is a line which very closely approximates the behavior of a long, slender, flexible stick. Consequently, by employing such splines at equally spaced intervals around the profiles, one can develop a smoothly faired blade geometry between the primary definition airfoils and from those airfoils to the root of the blade. (As discussed above, the S810 airfoil profile is employed from station 415 (88% R) to the tip 74 (100% R) of the blade 40).

Wind turbine blades of the character discussed above and illustrated in FIG. 4 exhibit improved energy production characteristics and efficiency. At the same time, the blades have a low weight, a long service life, and high fatigue resistance. Furthermore, the definition airfoil profiles have the advantage of being relatively insensitive to leading edge roughness as do the interpolated profiles. This is important because leading edge roughness attributable to poor manufacturing techniques, damage by foreign objects, and/or the accumulation of airborne debris can reduce the maximum lift coefficient of the blade by as much as 25 percent. The decrease in maximum lift coefficient is directly translatable into a decrease in aerodynamic performance and efficiency.

All three of the primary, defined sections S815, S809, and S810 employed in blade 40 are members of the family referred to as thick airfoil sections, thickness in this respect being expressed by the fraction t/c(thickness ratio). The S series definition airfoil profiles and the intermediate, interpolated airfoil profiles generated by the lofting process discussed above and illustrated in FIG. 4C define blades which easily withstand the heavy loads imposed on blades ranging in length from 25 to 50 feet (300 to 600 ins).

The S815 airfoil profile has a maximum thickness ratio t/c of 26 percent, which occurs approximately at the 27 percent chordwise station and a leading edge nose radius which is approximately 2 percent of the chord. This airfoil profile is completely and uniquely defined by its outline as presented in FIG. 5, which shows the airfoil surface height to chord ratio plotted against chordwise station together with its mean chord line (FIG. 6) and thickness ratio curve 94 of (FIG. 7). Also useful are inboard airfoils like the S815 with t/c ratios lying between the upper and lower limits indicated by curves 90 and 92 in the same figure.

The S815 airfoil profile is also uniquely defined by its coordinates which appear in Table 3 below and are shown graphically in FIG. 5:

TABLE 3

Figure 8:
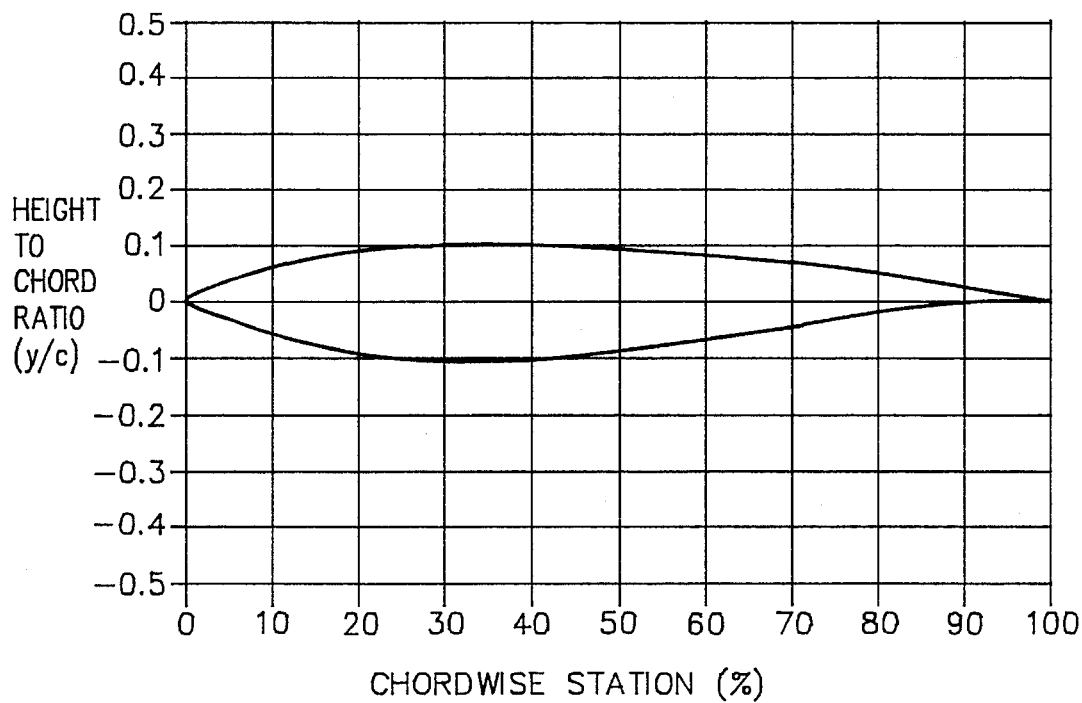
FIGS. 8, 9, and 10 are figures corresponding to FIGS. 5–7; they absolutely define the second NREL airfoil profile which appears in FIG. 8; that airfoil is employed near the midspan of the blade.
Figure 9:
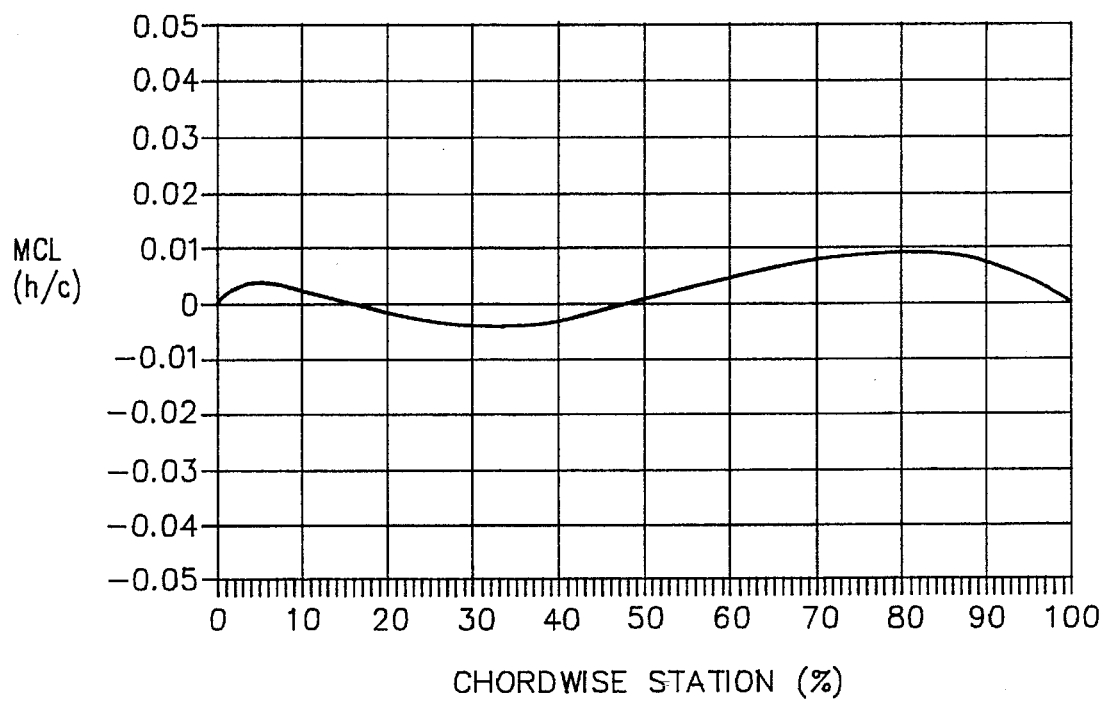
Figure 10:
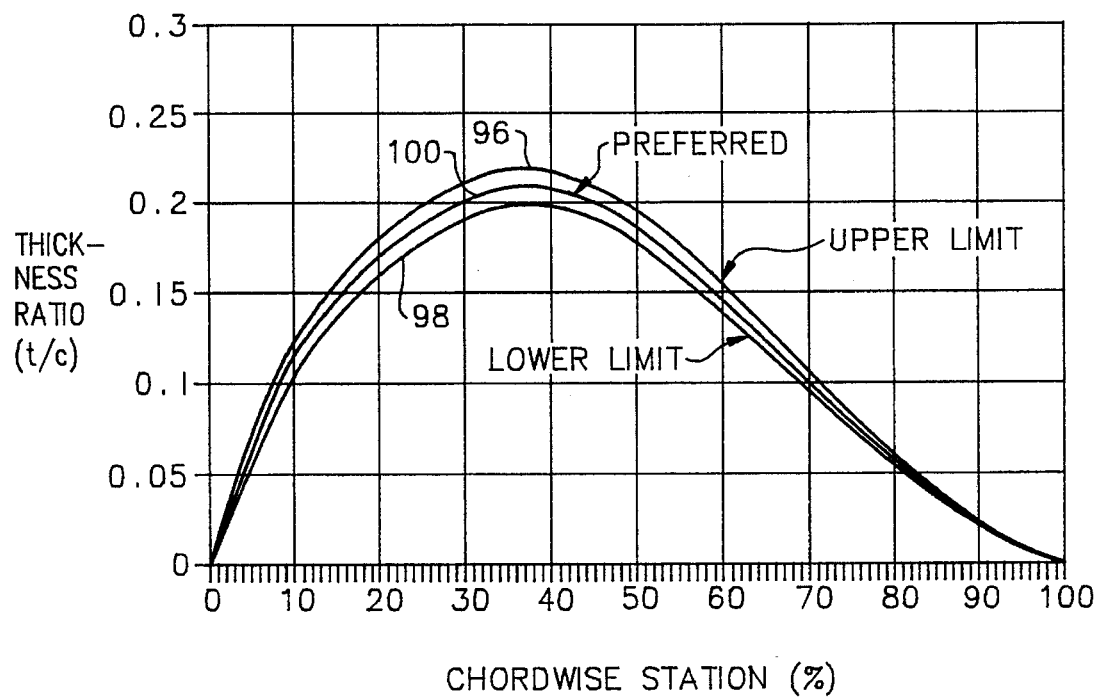

| Upper Surface | | Lower Surface | |
|---|---|---|---|
| x/c | y/c | x/c | y/c |
| 0.00057 | 0.00537 | 0.00110 | −0.00764 |
| .00658 | .01777 | .00741 | −.02242 |
| .01821 | .03072 | .01808 | −.03839 |
| .03475 | .04381 | .03268 | −.05497 |
| .05579 | .05671 | .05083 | −.07167 |
| .08099 | .06913 | .07213 | −.08804 |
| .11003 | .08082 | .09618 | −.10358 |
| .14253 | .09152 | .12257 | −.11776 |
| .17811 | .10101 | .15092 | −.12995 |
| .21637 | .10902 | .18094 | −.13947 |
| .25688 | .11531 | .21239 | −.14548 |
| .29916 | .11947 | .24569 | −.14690 |
| .34317 | .12093 | .28191 | −.14360 |
| .38927 | .11972 | .32148 | −.13627 |
| .43735 | .11645 | .36439 | −.12537 |
| .48685 | .11157 | .41069 | −.11151 |
| .53719 | .10540 | .46020 | −.09549 |
| .58773 | .09821 | .51257 | −.07811 |
| .63784 | .09024 | .56728 | −.06032 |
| .68686 | .08175 | .62362 | −.04304 |
| .73414 | .07294 | .68061 | −.02724 |
| .77902 | .06397 | .73706 | −.01371 |
| .82087 | .05500 | .79160 | −.00312 |
| .85909 | .04613 | .84270 | .00417 |
| .89307 | .03733 | .88881 | .00809 |
| .92258 | .02838 | .92844 | .00894 |
| .94785 | .01943 | .96029 | .00725 |
| .96899 | .01127 | .98298 | .00400 |
| .98548 | .00495 | .99592 | .00109 |
| .99623 | .00118 | 1.00000 | .00000 |
| 1.00000 | .00000 | | | where:
x=the distance along the chord line, from the leading edge to the local station
y=the distance measured along a perpendicular to the chord line, from the chord line to the surface The generally midspan S809 profile has a maximum thickness ratio of 21 percent, which occurs approximately at the 38 percent chordwise station; and it has a leading edge nose radius which is approximately 1 percent of the chord. FIGS. 8, 9, and 10 describe the S809 profile. And, in FIG. 10, the upper, lower, and preferred limits for the thickness distribution of this airfoil and useful derivatives are described by curves 96, 98, and 100.

The S809 airfoil profile is also completely described by the coordinates which appear in Table 4 below.

TABLE 4

| Upper Surface | | Lower Surface | |
|---|---|---|---|
| x/c | y/c | x/c | y/c |
| 00037 | .00275 | .00140 | −.00498 |
| .00575 | .01166 | .00933 | −.01272 |
| .01626 | .02133 | .02321 | −.02162 |
| .03158 | .03136 | .04223 | −.03144 |
| .05147 | .04143 | .06579 | −.04199 |

TABLE 4-continued

| Upper Surface | | Lower Surface | |
|---|---|---|---|
| x/c | y/c | x/c | y/c |
| .07568 | .05132 | .09325 | −.05301 |
| .10390 | .06082 | .12397 | −.06408 |
| .13580 | .06972 | .15752 | −.07467 |
| .17103 | .07786 | .19362 | −.08447 |
| .20920 | .08505 | .23175 | −.09326 |
| .24987 | .09113 | .27129 | −.10060 |
| .29259 | .09594 | .31188 | −.10589 |
| .33689 | .09933 | .35328 | −.10866 |
| .38223 | .10109 | .39541 | −.10842 |
| .42809 | .10101 | .43832 | −.10484 |
| .47384 | .09843 | .48234 | −.09756 |
| .52005 | .09237 | .52837 | −.08697 |
| .56801 | .08356 | .57663 | −.07442 |
| .61747 | .07379 | .62649 | −.06112 |
| .66718 | .06403 | .67710 | −.04792 |
| .71606 | .05462 | .72752 | −.03558 |
| .76314 | .04578 | .77668 | −.02466 |
| .80756 | .03761 | .82348 | −.01559 |
| .84854 | .03017 | .86677 | −.00859 |
| .88537 | .02335 | .90545 | −.00370 |
| .91763 | .01694 | .93852 | −.00075 |
| .94523 | .01101 | .96509 | .00054 |
| .96799 | .00600 | .98446 | .00065 |
| .98528 | .00245 | .99612 | .00024 |
| .99623 | .00054 | 1.00000 | .00000 |
| 1.00000 | .00000 | | | where:
x=the distance along the chord line, from the leading edge to the local station
y=the distance measured along a perpendicular to the chord line, from the chord line to the surface The S810 airfoil profile has a maximum thickness ratio of 18 percent, which occurs approximately at the 43 percent chordwise station. This airfoil profile has a leading edge nose ratio which is approximately 0.6 percent of the chord. This airfoil profile is described by the parameters depicted graphically in FIGS. 11, 12, and 13. In FIG. 13, the upper and lower limits on the thickness distribution of the S810 airfoil profile and its relatives, as employed in blade 40 and the preferred thickness distribution are respectively identified by curves 102, 104, and 106.

The S810 airfoil profile is also completely and uniquely described by its coordinates which appear in Table 5 below.

TABLE 5

| Upper Surface | | Lower Surface | |
|---|---|---|---|
| x/c | y/c | x/c | y/c |
| .00163 | .00470 | .00031 | −.00183 |
| .00786 | .01261 | .00573 | −.00687 |
| .01903 | .02110 | .01878 | −.01197 |
| .03497 | .02989 | .03790 | −.01805 |
| .05550 | .03874 | .06237 | −.02507 |
| .08038 | .04747 | .09136 | −.03299 |
| .10934 | .05589 | .12403 | −.04145 |
| .14205 | .06384 | .15989 | −.04991 |
| .17816 | .07118 | .19860 | −.05809 |
| .21727 | .07777 | .23960 | −.06584 |
| .25895 | .08349 | .28221 | −.07277 |
| .30273 | .08820 | .32604 | −.07833 |
| .34815 | .09179 | .37090 | −.08224 |
| .39470 | .09415 | .41642 | −.08442 |
| .44186 | .09515 | .46207 | −.08459 |
| .48909 | .09466 | .50762 | −.08229 |
| .53586 | .09249 | .55310 | −.07728 |
| .58155 | .08816 | .59877 | −.06938 |
| .62652 | .08079 | .64530 | −.05915 |

TABLE 5-continued

| Upper Surface | | Lower Surface | |
| --- | --- | --- | --- |
| x/c | y/c | x/c | y/c |
| .67191 | .07091 | .69265 | −.04792 |
| .71769 | .06015 | .74000 | −.03683 |
| .76278 | .04960 | .78635 | −.02660 |
| .80612 | .03971 | .83065 | −.01778 |
| .84676 | .03078 | .87180 | −.01070 |
| .88380 | .02289 | .90873 | −.00550 |
| .91657 | .01593 | .94044 | −.00213 |
| .94473 | .00994 | .96603 | −.00036 |
| .96786 | .00522 | .98478 | .00022 |
| .98531 | .00205 | .99618 | .00013 |
| .99626 | .00044 | 1.00000 | .00000 |
| 1.00000 | .00000 | | | where:

x=the distance along the chord line, from the leading edge to the local station y=the distance measured along a perpendicular to the chord line, from the chord line to the surface The geometry and configuration of one representative blade 40 of the character described above is summarized in Table 6 below.

TABLE 6

| Blade Length | 477.00 in |
| --- | --- |
| Hub Radius | 39.00 in |
| Tip Radius | 516.00 in |
| Total Blade Twist | 5.85 deg |
| Operational Pitch Setting | −1.00 deg |
| Rotor Speed | 60.00 rpm |
| Blade Coning Angle | 7.00 deg |
| Root (inboard) Airfoil | S815 |
| Midspan Airfoil | S809 |
| Tip (outboard) Airfoil | S810 |
| Blade Weight | 960.00 lbs |
| Maximum Chord | 45.496 in |
| Maximum Chord Station | 154.80 in |
| Tip Chord | 14.55 in |
| Root Chord | 33.17 in |

In evaluating the performance of a wind machine such as the one identified by reference character 24 in FIG. 1, perhaps the most important measure is the power coefficient of the wind turbine rotor.

Power coefficient is defined as that fraction of the power in the wind contained in the stream tube defined by the rotor radius which the rotor is able to transform into rotational shaft power. (Reference character 85 in FIG. 1 identifies the boundary of the stream tube of rotor 24). Thus, a power coefficient of 0.5 indicates that the rotor is turning 50 percent of the power contained in the stream tube bounded wind into usable shaft power.

The mechanics of fluids flowing over blades such as those identified by reference characters 40 and 42 impose a theoretical limit on the power coefficient. This value is known as the Betz limit. Because of that limit, even an absolutely ideal rotor cannot have a power coefficient greater than 0.596.

Figure 16:
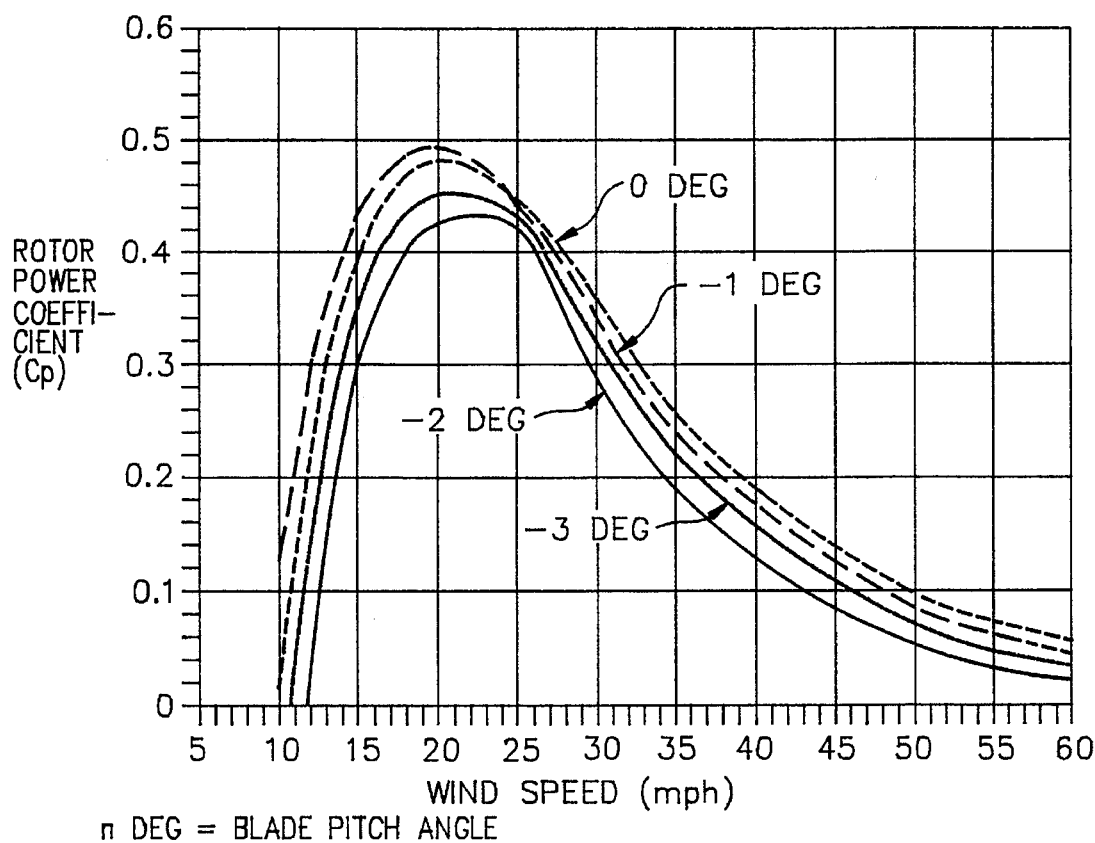
FIG. 16 is a plot of rotor power coefficient versus wind speed for the blade shown in FIG. 4 and for blades which differ from the latter only in the blade pitch; this figure accordingly reflects the efficiency of the FIG. 1 turbine rotor over the range of wind speeds encompassed by the figure.

Maximum recorded power coefficients for optimal rotor designs are on the order of 0.5. As shown in FIG. 16, the wind turbine rotor 24 with blades 40 and 42 has a power coefficient approaching this maximum of 0.5. This means that rotor 24 is very efficient, especially at commonly prevailing, relatively low wind speeds of approximately 20 mph.

FIG. 16 also shows that even small changes in the pitch angle of the rotor blades can have a marked effect on the power coefficient and also equally effect the wind speed at which the turbine 20 most effectively operates. This is a significant feature of the present invention because adjustments in pitch angle are easily made. Wind machines such as that identified by reference character 20 can accordingly be tuned to produce maximum power at prevailing wind speeds with only a modest decrease in the rotor power coefficient.

Figure 17:
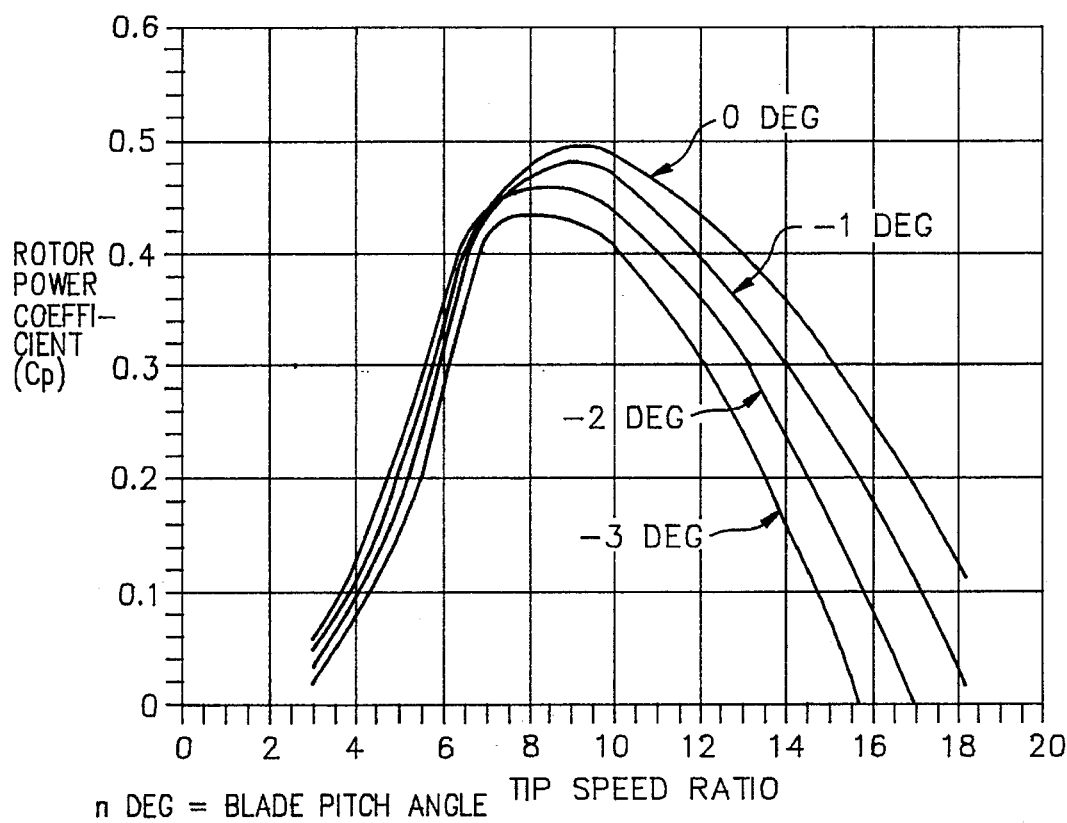
FIG. 17 is a similar figure showing the rotor power coefficient of the FIG. 1 turbine with the blades set to different degrees of pitch over a range of tip speed RATIOS.

FIG. 17 is similar to FIG. 16 with rotor power coefficient being plotted in FIG. 17 against tip speed ratio rather than wind speed. It will be remembered that tip speed ratio is the velocity of the rotor blade tips 74 divided by the velocity of the wind turning rotor 24. Tip speed ratio is a fundamental controlling parameter in wind turbine blade design as it is invariant and absolutely relates spanwise variations in local velocity factors with local angle of attack. FIG. 17 demonstrates that the wind turbine rotor blades of the present invention have tip speed ratios such that the power coefficients of the blades are very close to the maximum imposed by the Betz limit. FIG. 17 also shows that a marked change in performance—in this case measured by tip speed ratio—will result from making small changes in the pitch angle of the rotor blades.

Figure 19:
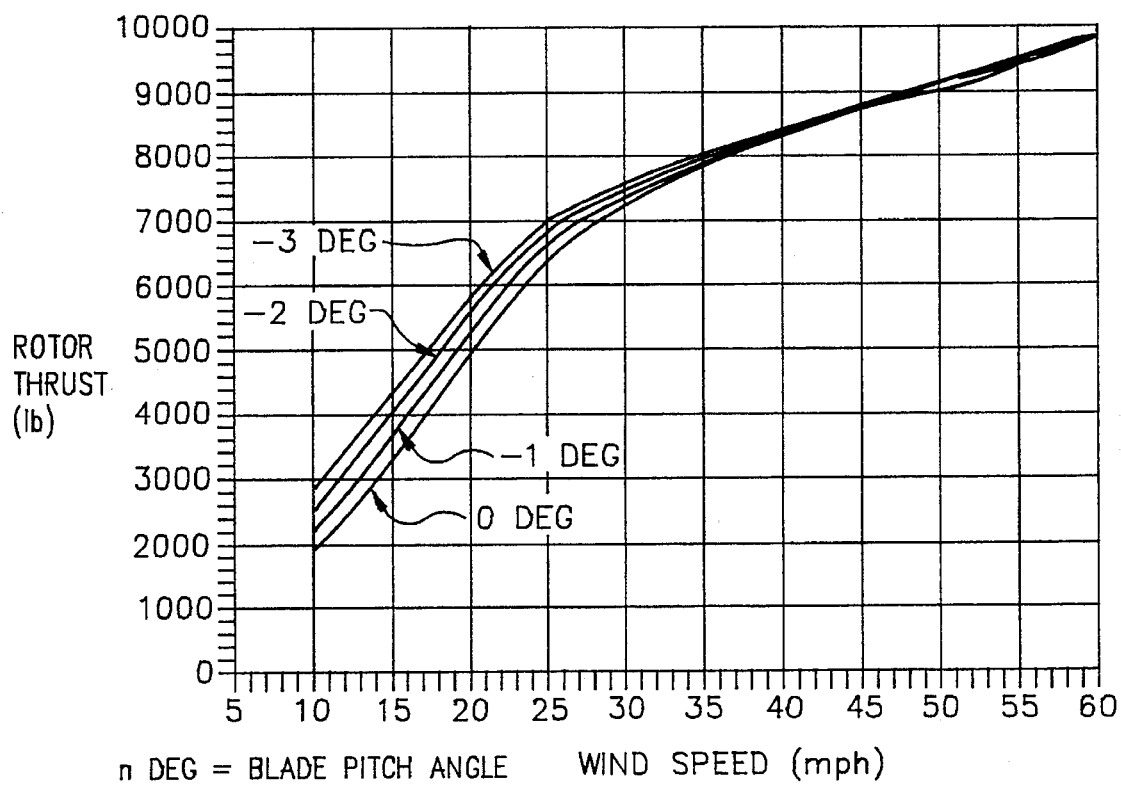
FIG. 19 is a graph showing the thrust developed in the turbine rotor with the blades at different pitch angles over the same range of wind speeds; in this figure the curves reflect the loads exerted on the rotor supporting bearings and, consequentially, the service life of those bearings.

The wind driving turbine 20 imposes on the turbine rotor 24 a force—rotor thrust—which acts in the direction indicated by arrows 68 and 70 in FIG. 2. Rotor thrust is important because it defines many of the loads which the components of the wind turbine 20 illustrated in FIG. 3 must be designed to withstand. In addition, the wind turbine-supporting tower 22 must be designed to withstand these loads. As one would expect, FIG. 19 shows that thrust loads of the character disclosed herein increase with wind speed. FIG. 19 also makes it clear that the pitch angle of the rotor blades also has a significant effect on thrust load, especially at wind speeds below 40 mph.

Figure 20:
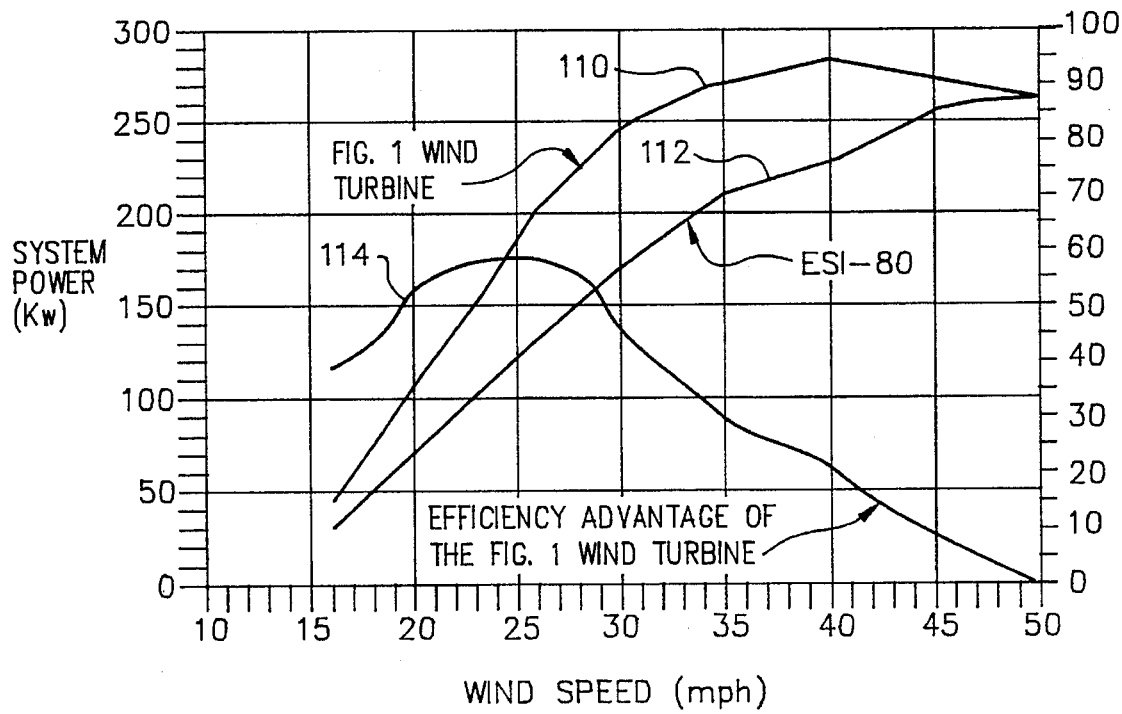
FIG. 20 is a graph in which rotor power versus wind speed is plotted for the FIG. 1 wind turbine and for a second, heretofore representative state-of-the-art wind turbine; this figure also shows that the FIG. 1 wind turbine has a higher output over substantially the entire range of wind speeds embraced by the figure.

FIG. 20 contains curves 110 and 112 which compare the system power output of a wind turbine 20 as depicted in FIG. 1 and discussed above and a representative, heretofore state-of-the-art ESI-80 wind turbine over a wind speed range of approximately 16 to 50 mph. Wind machine 20 exhibits superior performance except at the very upper, 50 mph limit of the wind speed range. The performance advantage of wind turbine 20 at different wind speeds is shown by curve 114.

Maximum increases in efficiency appear in the wind speed range of approximately 20–28 mph. This is important because power generating wind turbines are normally employed at sites where winds with speeds in that range contain the majority of energy extractable.

Figure 21:
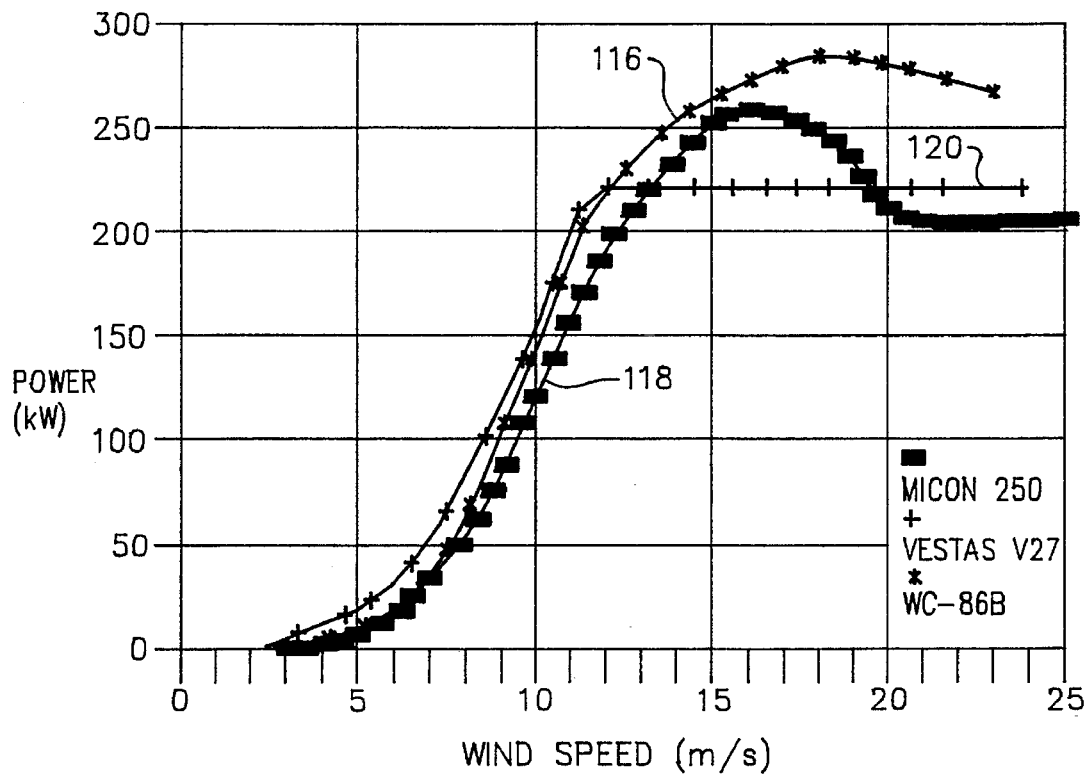
FIGS. 21, 22, and 23 are graphs in which power, system power coefficient, and machine cost vs. annual production are plotted for the wind turbine of the present invention shown in FIGS. 1 and 2 and for two other wind machines which have heretofore been considered to have state-of-the-art performance; the FIGS. 1 and 2 wind turbine is labelled WC-86B.
Figure 22:
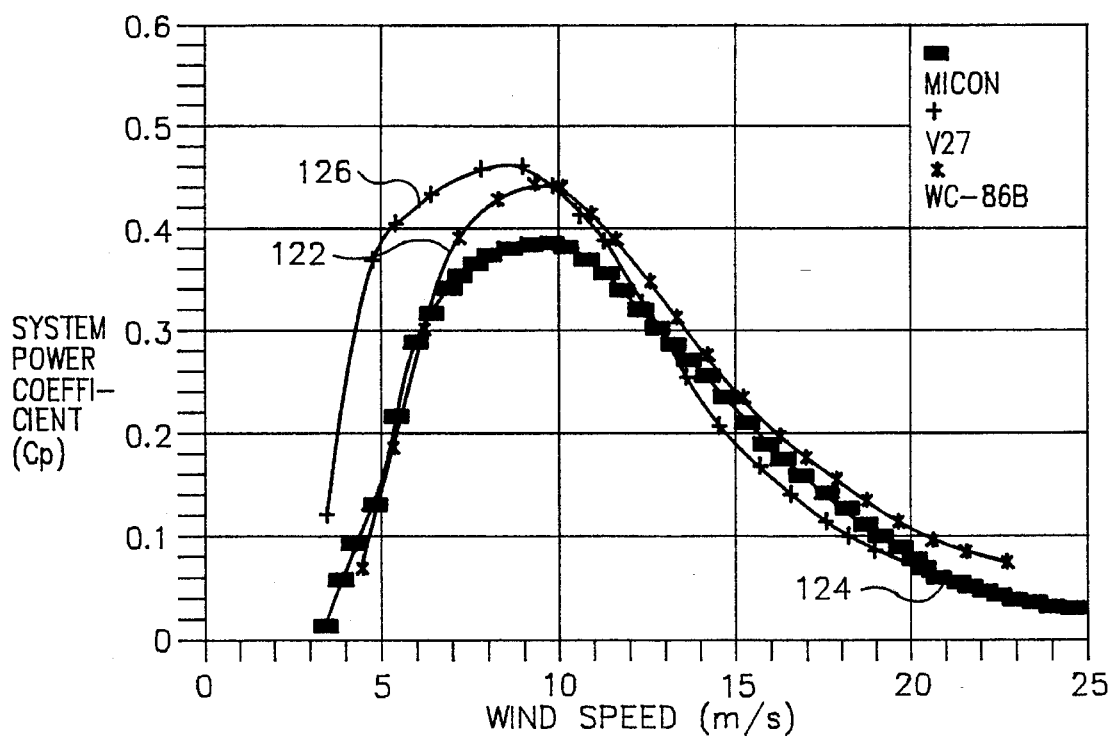
Figure 23:
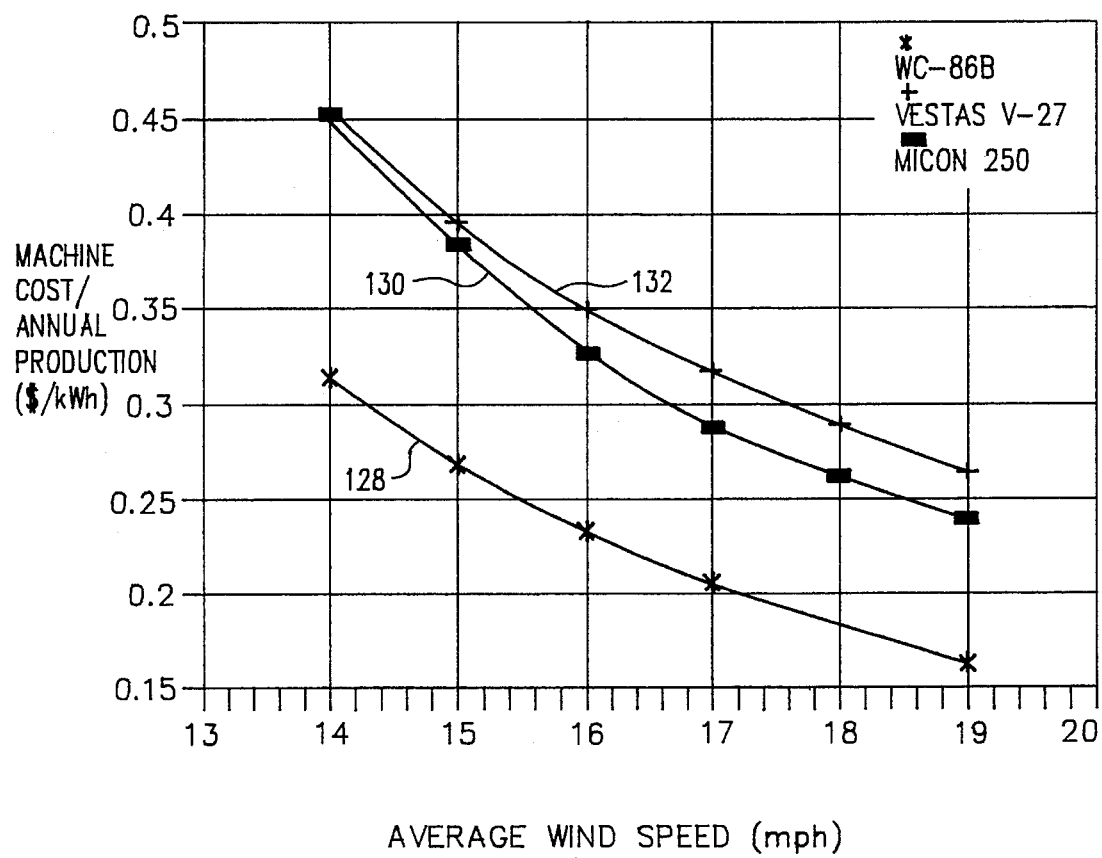

Important features of wind turbine 20 and two other modern wind turbines—a Micon 250 and a Vestas V-27—are compared in FIGS. 21, 22, and 23.

Power curves for these three turbines at wind speeds ranging up to 25 m/s are plotted in FIG. 21 and identified by reference characters 116, 118, and 120. Wind turbine 20 outputted more power than the Micon 250 over the entire range of wind speeds depicted in this figure, especially at those higher wind speeds where the power output is at or near its maximum.

It will be remembered that power coefficient is another important measure of a wind turbine's performance. Power coefficients for the three wind turbines over the same range of wind speeds are shown in FIG. 22 and identified by reference characters 122, 124, and 126. Except at low wind speeds; i.e., those below 10 m/s wind turbine 20 has a higher system coefficient of performance than either the Micon wind machine or the V-27 wind machine.

One, if not the, most important criterion in evaluating a wind machine is the ratio of its capital cost to its annual production at the wind speeds expected to prevail in the location where the wind machine is sited. Cost/production curves over a wind speed range of 14 to 19 mph for wind turbine 20 and for the Micon and Vestas machines are plotted in FIG. 23 and identified by reference characters 128, 130, and 132. At wind speeds toward the upper end of this 14–19 mph range, the capital cost of producing electricity by wind turbine 20 is up to 40 percent less than it would be if the Vestas machine were employed and over 30 percent lower than it would be if the Micon machine were selected. Significant cost savings are also available over the remainder of the wind speed range shown in FIG. 23.

Wind turbine 24, the V-27 machine, and the Micon turbine are comparable in size. The Micon wind machine has fixed pitched blades and a rigid hub. The V-27 utilizes variable pitched blades to enhance performance at low wind speeds, a performance increase which is perhaps more than offset by higher capital and maintenance costs and increased down time, especially in areas where skilled mechanics may not be readily available.

Wind turbine blades 40 and 42 will typically be of the wood/GRE laminate construction illustrated in FIGS. 24 and 25. The representative blade 40 shown in these figures has a web 134 which spans a portion of the blade interior and a shell 138 composed of an upper section 140 and a lower section 142. These sections are bonded together into an integrated structure at the nose or leading edge 86 of the blade and at the trailing edge 87 of the blade.

Web 134 is employed toward the leading edge 86 of blade 40 as shown in FIG. 24 to strengthen and add rigidity to the blade with 0.1 in thick plies. This web is typically fabricated from fir plywood. Opposite edges of the rib are seated in blade spanning stringers 144 and 146 which are adhesively attached to upper and lower shell sections 140 and 142 of the blade.

As is better shown in FIG. 24, these upper and lower sections 140 and 142 of the blade's shell 138 are made up of alternated, typically 0.1 in thick, fir veneers 148 and GRE lamina 150. The latter are mats or other arrays of glass, carbon, or other reinforcing fibers impregnated with an epoxy resin. The thickness of the shell is varied spanwise in the interest of obtaining an optimal blade strength distribution.

A combination of heat and pressure is applied to the laid up structure to bond the veneers 148 and GRE lamina 150 structure together and to set the epoxy resin.

The resulting blade 40 is strong, abrasion and fatigue resistant, and light. The representative blade 40 fabricated as just described and shown in FIGS. 24 and 25 is almost 40 feet long but weighs only 960 pounds.

The invention may be embodied in still other forms without departing from the spirit or essential characteristics of the invention. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A hollow wind turbine rotor blade which has:

NREL thick airfoil profiles;

a length in the range of 25 to 50 feet;

a total blade twist of not more than 10 degrees;

a blade coning angle in the range of 5 to 9 degrees;

a pitch angle in the range of −5 to +5 degrees; and a maximum section thickness ratio t/c of not more than 0.26.

2. A wind turbine rotor blade as defined in claim 1 which has a total blade twist of 5.85 degrees +3, −1 degrees.

3. A wind turbine comprising a rotor which has an axis of rotation and a blade as defined in claim 1 which is rotatable about said axis of rotation, said blade having a root, a tip, and a chord at each station along the blade, a plot of the chords being a smooth curve of increasing magnitude over that inboard segment of the blade extending from the root of the blade to a station at ca. 30 percent of R and a smooth curve of decreasing magnitude from said station to the tip of the blade.

4. A wind turbine comprising a rotor with an axis of rotation and a blade as defined in claim 1:

said blade having a tip;

the distance to the tip from said axis of rotation being ca. 516 in; and the NREL thick airfoil profiles being Nos. S815, S809, and S810 and being respectively at stations located ca. 180, 359, and 454 in from the axis of rotation.

5. A wind turbine rotor blade as defined in claim 1 which has a span and which is an airfoil over essentially the entire span.

6. A wind turbine rotor blade as defined in claim 5 which has a root end and a maximum chord at a station ca. 116 in from the root end of the blade.

7. A wind turbine rotor blade as defined in claim 1 which is hollow and is constructed of wood and a glass reinforced polymer.

8. A wind turbine rotor blade as defined in claim 7 which has a span and a wall, the wall thickness of said blade varying over the span of the blade.

9. A wind turbine which comprises:

a rotor with blades as defined in claim 1;

means supporting the rotor for rotation about a generally horizontal axis; and means for rotating said blades up to speed.

10. A wind turbine blade as defined in claim 1 which has a local twist distribution scheduled substantially as follows:

| Station (in) | Twist (deg) |
|---|---|
| 39.00 | 5.848 |
| 51.60 | 5.686 |
| 77.40 | 5.393 |
| 103.20 | 5.119 |
| 129.00 | 4.825 |
| 154.80 | 4.473 |
| 180.60 | 4.008 |
| 206.40 | 3.451 |
| 232.20 | 2.879 |
| 258.00 | 2.309 |
| 283.80 | 1.762 |
| 309.60 | 1.257 |
| 335.40 | 0.819 |
| 361.20 | 0.477 |
| 387.00 | 0.254 |
| 412.80 | 0.130 |
| 438.60 | 0.076 |
| 464.40 | 0.049 |
| 490.20 | 0.027 |
| 516.00 | 0.000. |

11. A wind turbine blade as defined in claim 1 with a defined inboard airfoil profile with a maximum thickness ratio t/c of not more than 0.26 and an outboard airfoil profile with a thickness ratio t/c of not more than 0.18.

12. A wind turbine rotor blade which has an NREL S815 inboard airfoil profile transitioning through an NREL S809 midspan airfoil profile to an NREL S810 outboard airfoil profile.

13. A wind turbine comprising a rotor which has an axis of rotation and a blade as defined in claim 12 which is displaceable about said axis of rotation, the inboard, midspan, and outboard S815, S809, and S810 airfoil profiles of said blade being at stations located ca. 35, 70, and 88 percent of R.

14. A stall-regulated wind turbine which has:
a rotor with blades as defined in claim 12;
means supporting the rotor for rotation about a horizontal axis; and
means for rotating said blades up to speed.

Figure 11:
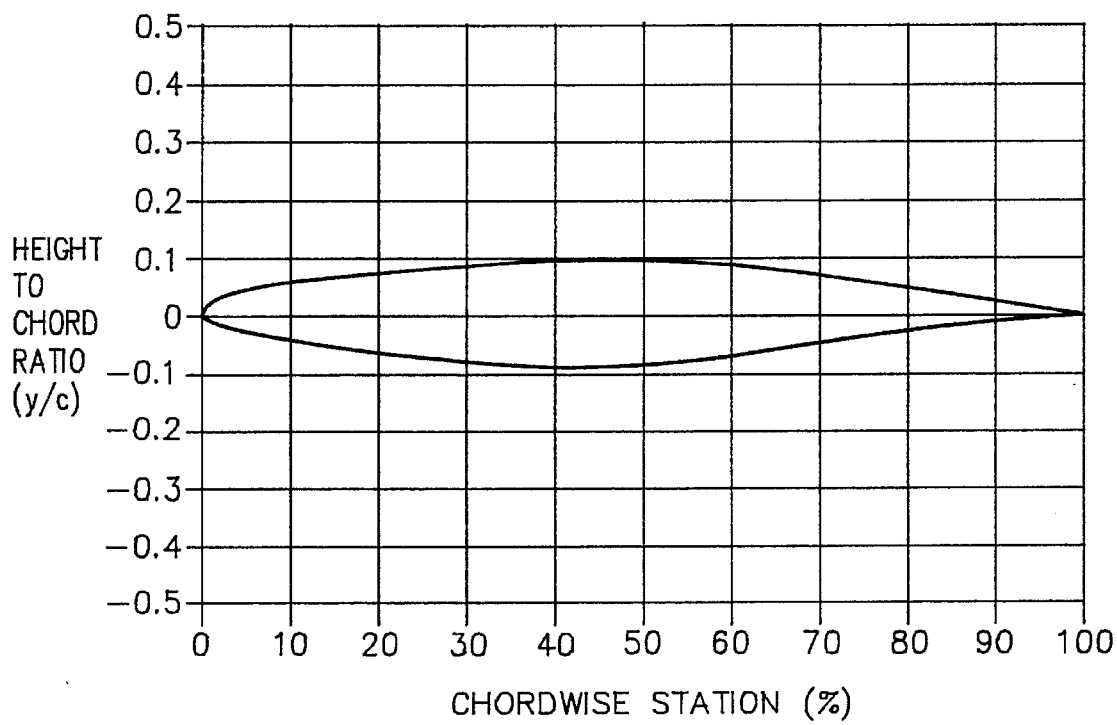
FIGS. 11–13 correspond to FIGS. 5–7 and absolutely define a third NREL airfoil which appears in FIG. 11 and is employed near the tip of the blade.

15. A wind turbine rotor blade which has:
a length in the range of 25 to 50 ft;
an inboard airfoil profile configured essentially as shown in FIG. 5;
a midspan airfoil profile configured essentially as shown in FIG. 8; and
an outboard airfoil profile configured essentially as shown in FIG. 11.

16. A wind turbine comprising a rotor which has a blade as defined in claim 15 and a variation in rotor power coefficient with tip speed ratio substantially as shown in FIG. 17.

17. A wind turbine rotor blade as defined in claim 15 which has a total blade twist of not more than 10 degrees.

18. A wind turbine rotor blade as defined in claim 17 which has a total blade twist of 5.85 degrees +3, −1 degrees.

19. A wind turbine rotor blade as defined in claim 15 which has a blade coning angle in the range of 5 to 9 degrees.

20. A wind turbine rotor blade as defined in claim 19 which has a blade coning angle of ca. 7 degrees.

21. A wind turbine rotor blade as defined in claim 15 which has a pitch angle in the range of −5 to +5 degrees.

22. A wind turbine rotor blade as defined in claim 15 which has a maximum section thickness ratio t/c of not more than 0.26.

23. A wind turbine comprising a rotor with an axis of rotation and a blade as defined in claim 15 which has a root, a tip, is rotatable about said axis of rotation, and has a chords at each station along the blade, a plot of the chord of said blade being a smooth curve of increasing magnitude over that inboard segment of the blade extending from the root of the blade to a station at ca. 30 percent R and a smooth curve of decreasing magnitude from said station to the tip of the blade.

24. A wind turbine comprising a rotor which has an axis of rotation and a blade as defined in claim 15, the defined inboard, midspan, and outboard airfoil profiles of said blade being at stations located ca. 35, 70, and 88 percent of R.

25. A wind turbine rotor blade as defined in claim 15 which has a span, said blade being an airfoil over essentially the entire span of the blade.

26. A wind turbine rotor blade as defined in claim 15 which has a root end and a maximum chord at a station ca. 116 in from the root end of the blade.

27. A wind turbine rotor blade as defined in claim 15 which is hollow and is constructed of wood and a fiber reinforced polymer.

28. A wind turbine rotor blade as defined in claim 26 which is hollow and has a wall with a thickness which varies over the span of the blade.

29. A stall-regulated wind turbine which comprises:
a rotor with multiple blades, each as defined in claim 15;
means supporting the rotor for rotation about a generally horizontal axis; and
means for rotating the blades up to speed.

30. A hollow wind turbine rotor blade which is an airfoil over essentially its entire span and has:
NREL thick airfoil profiles;
a length of ca. 477 in;
a root chord of ca 33.17 in±1.65 in;
a tip chord of ca. 14.55 in±0.75 in;
a maximum chord of 45.00 in.±2.25 in.
a total blade twist of not more than 10 degrees;
a blade coning angle in the range of 5 to 9 degrees;
a pitch angle in the range of −5 to +5 degrees; and
a maximum section thickness ratio t/c of not more than 0.26.

31. A wind turbine comprising a hollow rotor blade that is displaceable about an axis of rotation and has:
NREL thick airfoil profiles;
a length in the range of 25 to 50 feet;
a total blade twist of not more than 10 degrees;
a blade coning angle in the range of 5 to 9 degrees;
a pitch angle in the range of −5 to +5 degrees;
a maximum section thickness ratio t/c of not more than 0.26; and
a chord scheduled substantially as follows:

| r/R | Station (in) | Chord (in) | c/R |
| --- | --- | --- | --- |
| 0.076 | 39.00 | 33.170 | 0.0643 |
| 0.100 | 51.60 | 35.098 | 0.0680 |
| 0.150 | 77.40 | 38.863 | 0.0753 |
| 0.200 | 103.20 | 42.090 | 0.0816 |
| 0.250 | 129.00 | 44.420 | 0.0861 |
| 0.300 | 154.80 | 45.496 | 0.0882 |
| 0.350 | 180.60 | 44.967 | 0.0871 |
| 0.400 | 206.40 | 43.562 | 0.0844 |
| 0.450 | 232.20 | 42.126 | 0.0816 |
| 0.500 | 258.00 | 40.625 | 0.0787 |
| 0.550 | 283.80 | 39.024 | 0.0756 |
| 0.600 | 309.60 | 37.287 | 0.0723 |
| 0.650 | 335.40 | 35.378 | 0.0686 |
| 0.700 | 361.20 | 33.260 | 0.0645 |
| 0.750 | 387.00 | 30.919 | 0.0599 |
| 0.800 | 412.80 | 28.406 | 0.0551 |
| 0.850 | 438.60 | 25.786 | 0.0500 |
| 0.900 | 464.40 | 22.998 | 0.0446 |
| 0.950 | 490.20 | 19.129 | 0.0371 |
| 1.000 | 516.00 | 14.550 | 0.0282. |

32. A wind turbine comprising a hollow rotor blade which is displaceable about an axis of rotation and has:
NREL thick airfoil profiles;
a length in the range of 25 to 50 feet;
a total blade twist of not more than 10 degrees;
a blade coning angle in the range of 5 to 9 degrees;
a pitch angle in the range of −5 to +5 degrees;
a maximum section thickness ratio t/c of not more than 0.26; and
a blade twist distribution scheduled essentially as follows:

| r/R | Station (in) | Twist (deg) |
|---|---|---|
| 0.076 | 39.00 | 5.848 |
| 0.100 | 51.60 | 5.686 |
| 0.150 | 77.40 | 5.393 |
| 0.200 | 103.20 | 5.119 |
| 0.250 | 129.00 | 4.825 |
| 0.300 | 154.80 | 4.473 |
| 0.350 | 180.60 | 4.008 |
| 0.400 | 206.40 | 3.451 |
| 0.450 | 232.20 | 2.879 |
| 0.500 | 258.00 | 2.309 |
| 0.550 | 283.80 | 1.762 |
| 0.600 | 309.60 | 1.257 |
| 0.650 | 335.40 | 0.819 |
| 0.700 | 361.20 | 0.477 |
| 0.750 | 387.00 | 0.254 |
| 0.800 | 412.80 | 0.130 |
| 0.850 | 438.60 | 0.076 |
| 0.900 | 464.40 | 0.049 |
| 0.950 | 490.20 | 0.027 |
| 1.000 | 516.00 | 0.000. |

Figure 5:
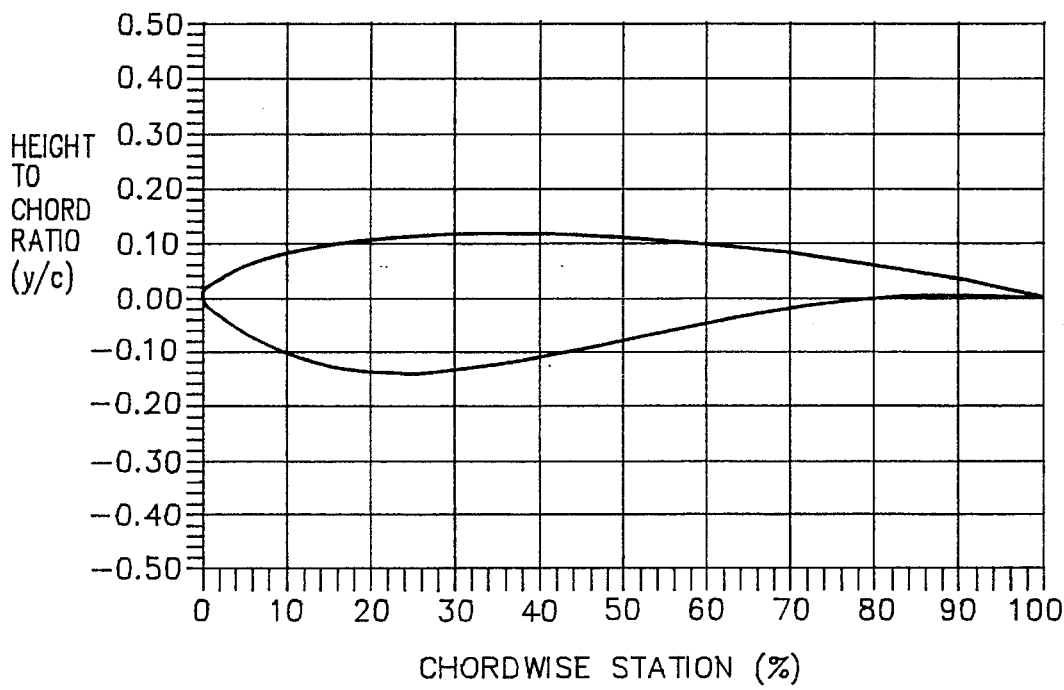
FIG. 5 shows, in more detail, the configuration of an NREL airfoil employed near the root of the wind turbine blade.

33. A wind turbine rotor blade which has a length in the range of 25 to 50 ft;

an inboard airfoil profile configured essentially as shown in FIG. 5;

a midspan airfoil profile configured essentially as shown in FIG. 8;

an outboard airfoil profile configured essentially as shown in FIG. 11; and a twist scheduled substantially as follows:

| r/R | Station (in) | Twist (deg) |
|---|---|---|
| 0.076 | 39.00 | 5.848 |
| 0.100 | 51.60 | 5.686 |
| 0.150 | 77.40 | 5.393 |
| 0.200 | 103.20 | 5.119 |
| 0.250 | 129.00 | 4.825 |
| 0.300 | 154.80 | 4.473 |
| 0.350 | 180.60 | 4.008 |
| 0.400 | 206.40 | 3.451 |
| 0.450 | 232.20 | 2.879 |
| 0.500 | 258.00 | 2.309 |
| 0.550 | 283.80 | 1.762 |
| 0.600 | 309.60 | 1.257 |
| 0.650 | 335.40 | 0.819 |
| 0.700 | 361.20 | 0.477 |
| 0.750 | 387.00 | 0.254 |
| 0.800 | 412.80 | 0.130 |
| 0.850 | 438.60 | 0.076 |
| 0.900 | 464.40 | 0.049 |
| 0.950 | 490.20 | 0.027 |
| 1.000 | 516.00 | 0.000. |

Figure 14:
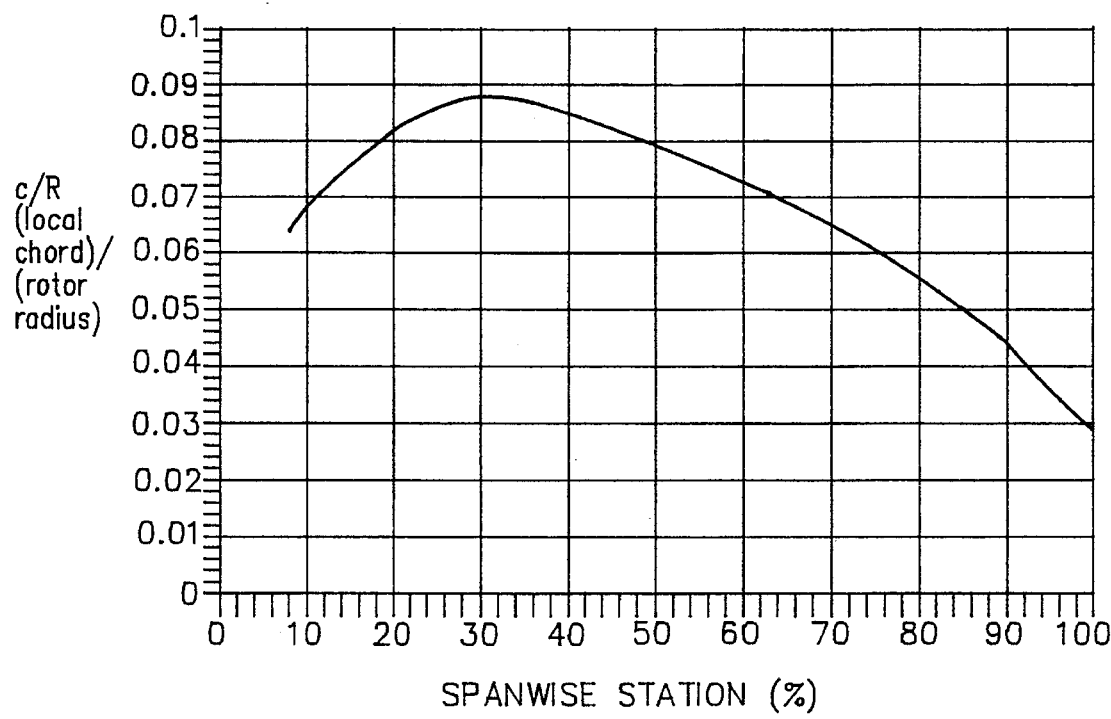
FIGS. 14 and 15 are plots of local chord/rotor radius (c/R) and local twist versus spanwise station for the blade shown in FIG. 4; these figures accordingly further define the configuration of the blade.

34. A wind turbine comprising a rotor blade which is displaceable about an axis of rotation and has:

a length in the range of 25 to 50 ft;

an inboard airfoil profile configured essentially as shown in FIG. 5;

a midspan airfoil profile configured essentially as shown in FIG. 8;

an outboard airfoil profile configured essentially as shown in FIG. 11; and a blade chord distribution scheduled substantially as shown in FIG. 14.

35. A wind turbine rotor blade which has:

a length of ca. 477 in;

a root chord of ca. 33.17 in.±1.65 in;

a tip chord of ca. 14.55 in.±0.75 in;

a maximum chord of 45.00 in.±2.25 in;

an inboard airfoil profile configured essentially as shown in FIG. 5;

a midspan airfoil profile configured essentially as shown in FIG. 8; and an outboard airfoil profile configured essentially as shown in FIG. 11.

Figure 6:
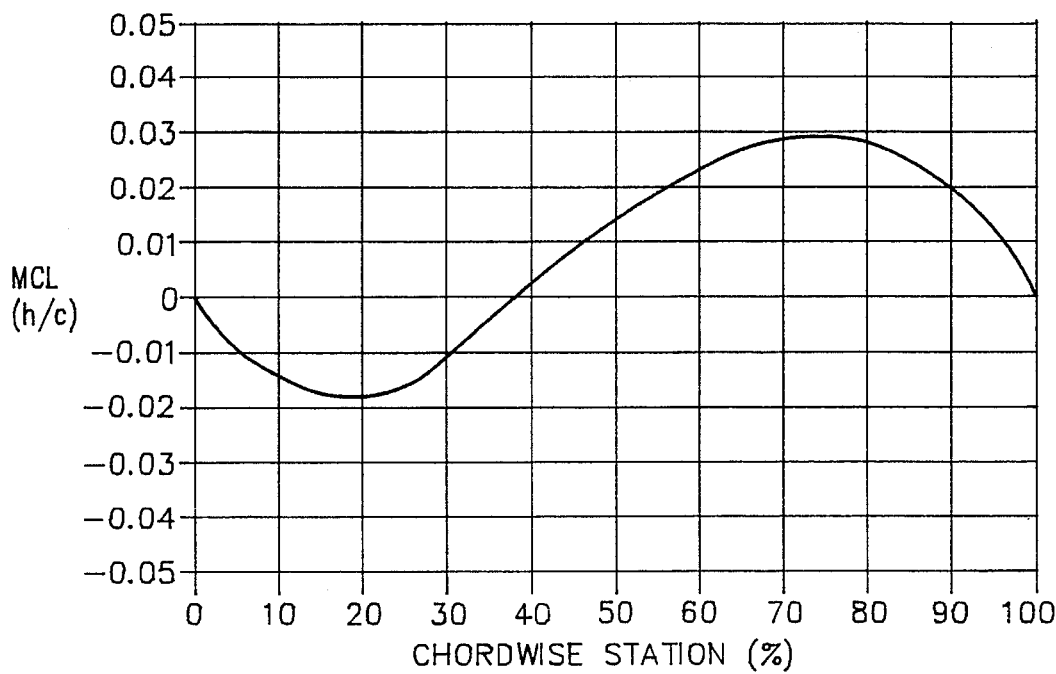
FIG. 6 is a plot of mean chord line versus chordwise station for the airfoil shown in FIG. 5.
Figure 7:
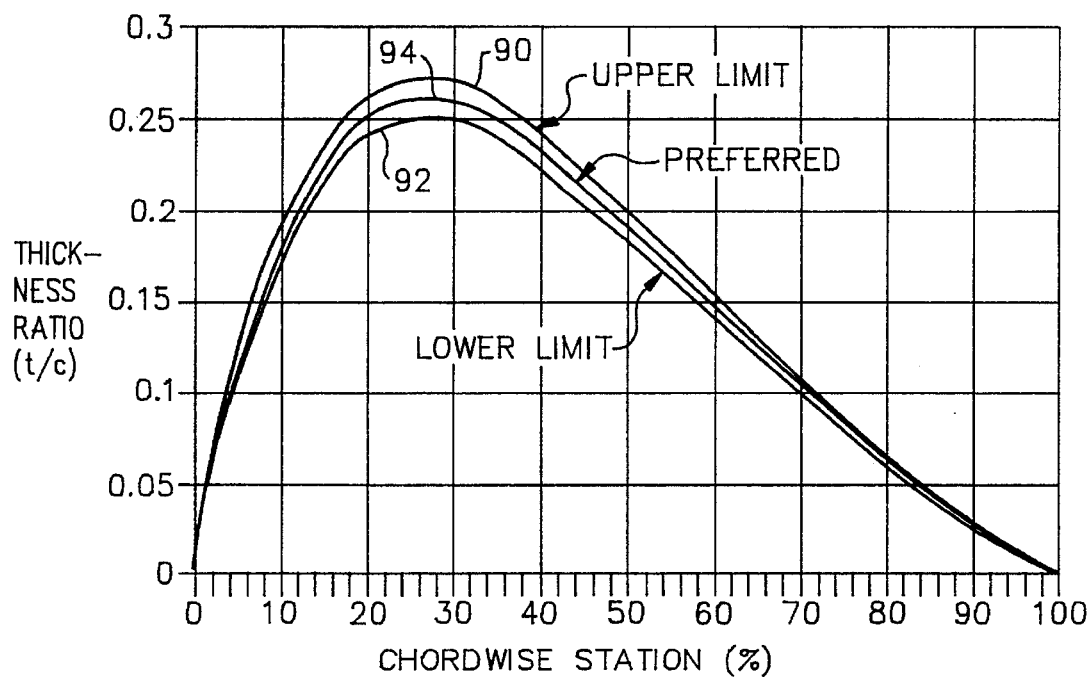
FIG. 7 is a plot of thickness ratio versus chordwise station for the blade of FIG. 5.
Figure 12:
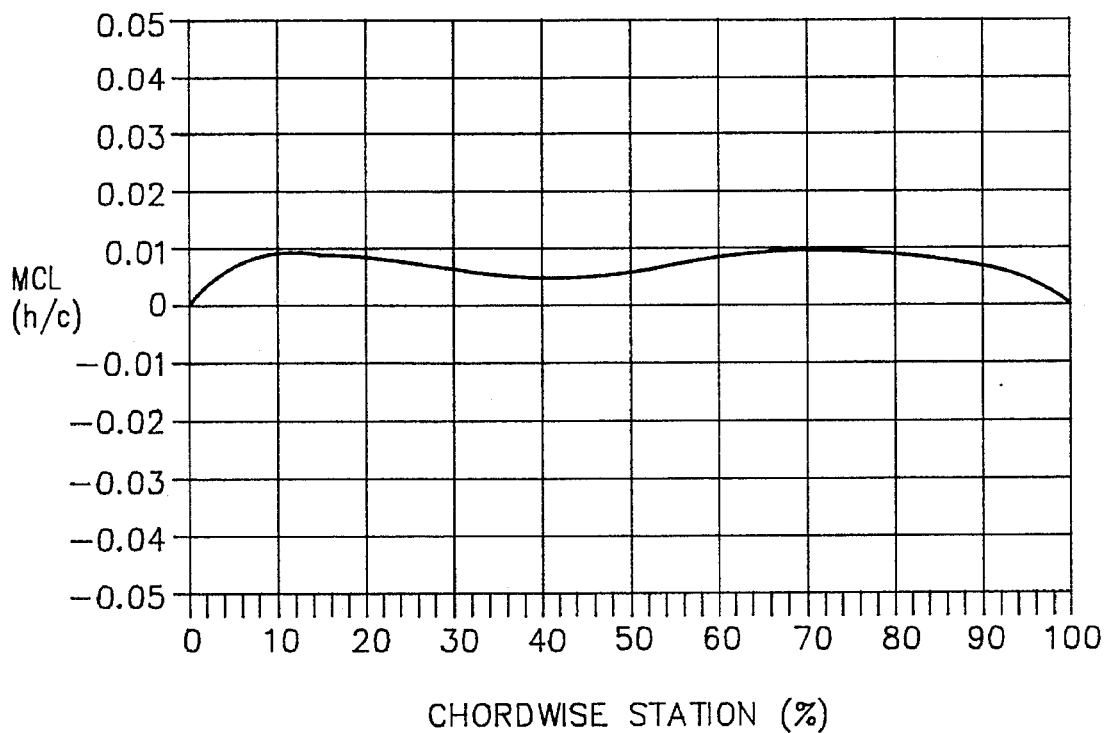
Figure 13:
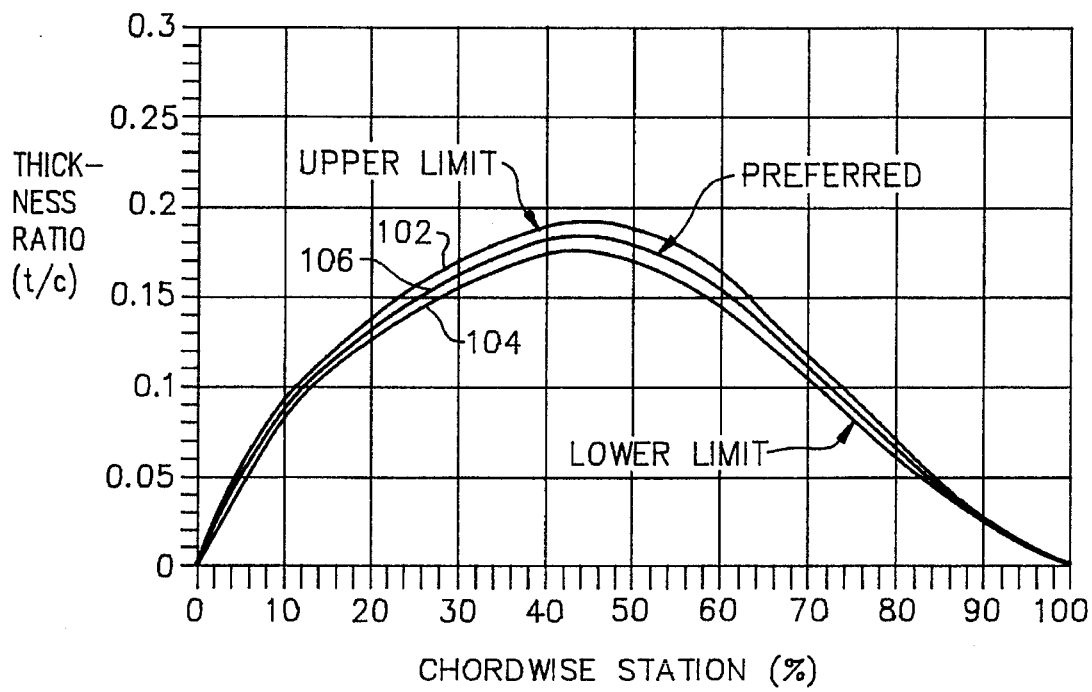

36. A wind turbine rotor blade with the following parameters and airfoil profiles:

a parameter as shown in FIG. 6;

a profile as shown in FIG. 5;

a parameter as shown in FIG. 7;

a profile as shown in FIG. 8;

a parameter as shown in FIG. 9;

a parameter as shown in FIG. 10;

a profile as shown in FIG. 11;

a parameter as shown in FIG. 12; and a parameter as shown in FIG. 13.

\* \* \* \* \*